US012709100B2

(12) United States Patent
Inui et al.

(10) Patent No.: US 12,709,100 B2
(45) Date of Patent: Aug. 18, 2026

(54) INKJET RECORDING APPARATUS

(71) Applicant: KYOCERA Document Solutions Inc., Osaka (JP)

(72) Inventors: Yasutaka Inui, Osaka (JP); Shuhei Kawamata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 210 days.

(21) Appl. No.: 18/644,281

(22) Filed: Apr. 24, 2024

(65) Prior Publication Data

US 2024/0359470 A1 Oct. 31, 2024

(30) Foreign Application Priority Data

Apr. 25, 2023 (JP) ................................ 2023-071267

(51) Int. Cl.
*B41J 2/165* (2006.01)

(52) U.S. Cl.
CPC .. *B41J 2/16552* (2013.01); *B41J 2002/16558* (2013.01); *B41P 2235/21* (2013.01)

(58) Field of Classification Search
CPC .................... B41J 2/16552; B41J 2002/16558
See application file for complete search history.

(56) References Cited

U.S. PATENT DOCUMENTS 10,259,225 B2 4/2019 Araki et al.
2003/0197753 A1* 10/2003 Okamoto ............. B41J 2/16547 347/32
2018/0194141 A1* 7/2018 Araki .................. B41J 2/16508
2021/0070053 A1* 3/2021 Inui ...................... B41J 2/16538

FOREIGN PATENT DOCUMENTS

JP 2011051281 A * 3/2011
JP 2018108711 A 7/2018

* cited by examiner

*Primary Examiner* — Sharon Polk
(74) *Attorney, Agent, or Firm* — Studebaker Brackett PLLC

(57) ABSTRACT

An image forming apparatus includes an inkjet head, a blade and a cleaning liquid supply member. The inkjet head is provided with a nozzle surface on which ink ejection ports of a plurality of nozzles are opened. The blade is movable in contact with the nozzle surface. The cleaning liquid supply member supplies a cleaning liquid to at least one of the nozzle surface and the blade. The cleaning liquid supply member has a lower surface. On the lower surface, an opening through which the cleaning liquid is discharged and a protrusion with which the cleaning liquid discharged through the opening can be in contact are formed.

7 Claims, 17 Drawing Sheets

INKJET RECORDING APPARATUS

INCORPORATION BY REFERENCE

This application is based on and claims the benefit of priority from Japanese patent application No. 2023-071267 filed on Apr. 25, 2023, which is incorporated by reference in its entirety.

BACKGROUND

The present disclosure relates to an inkjet recording apparatus provided with a wipe unit which wipes ink adhered on a nozzle surface of an inkjet head.

An inkjet recording apparatus is provided with a wipe unit which wipes ink adhered on a nozzle surface of an inkjet head. The wipe unit includes a blade which moves in one direction from a moving start position to a moving end position while in contact with the nozzle surface, and is movable between a wiping position below the inkjet head and a separated position separated from the space below the inkjet head. When wiping, the wipe unit is moved to the wiping position, and the blade is moved from the moving start position to the moving end position while in contact with the nozzle surface, so that the ink adhered on the nozzle surface is wiped off by the blade.

In addition, the inkjet recording apparatus may be provided with a cleaning liquid supply member which supplies a cleaning liquid on the downstream side of the moving start position in the moving direction of the blade. The cleaning liquid supply member is provided adjacent to the nozzle surface of the inkjet head, for example. When wiping, the cleaning liquid is supplied from the cleaning liquid supply member, and the ink adhered on the nozzle surface is wiped off by the blade together with the cleaning liquid.

In the above-described inkjet recording apparatus, the cleaning liquid supply member is provided adjacent to the nozzle surface of the inkjet head. That is, since the cleaning liquid supply member is integrally provided on the inkjet head, the ink supplied to the cleaning liquid supply member is adjacent to the nozzle surface even during printing. Therefore, if a sheet passing under the inkjet head may be bent upward during the printing, the sheet comes into contact with the cleaning liquid supply member, and the sheet may be contaminated by the cleaning liquid or the cleaning liquid supply member may be damaged by the sheet.

In addition, it is also necessary to securely hold the cleaning liquid supplied from a cleaning liquid tank to the cleaning liquid supply member so as not to fall from the cleaning liquid supply member.

SUMMARY

An image forming apparatus according to the present disclosure includes an inkjet head, a blade and a cleaning liquid supply member. The inkjet head is provided with a nozzle surface on which ink ejection ports of a plurality of nozzles are opened. The blade is movable in contact with the nozzle surface in a moving direction from a moving start position to a moving end position. The cleaning liquid supply member which stores a cleaning liquid and supplies the cleaning liquid to the blade moving in the moving direction from the moving start position. The cleaning liquid supply member has a lower surface. The lower surface has at least one opening and at least one protrusion. Through the opening, the cleaning liquid is discharged. The protrusion is disposed on an upstream side of the opening in the moving direction and the cleaning liquid leaked through the opening and flowed through the lower surface gathers at the protrusion.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the attached drawings, an inkjet recording apparatus 1 according to one embodiment of the present disclosure will be described.

Figure 1:
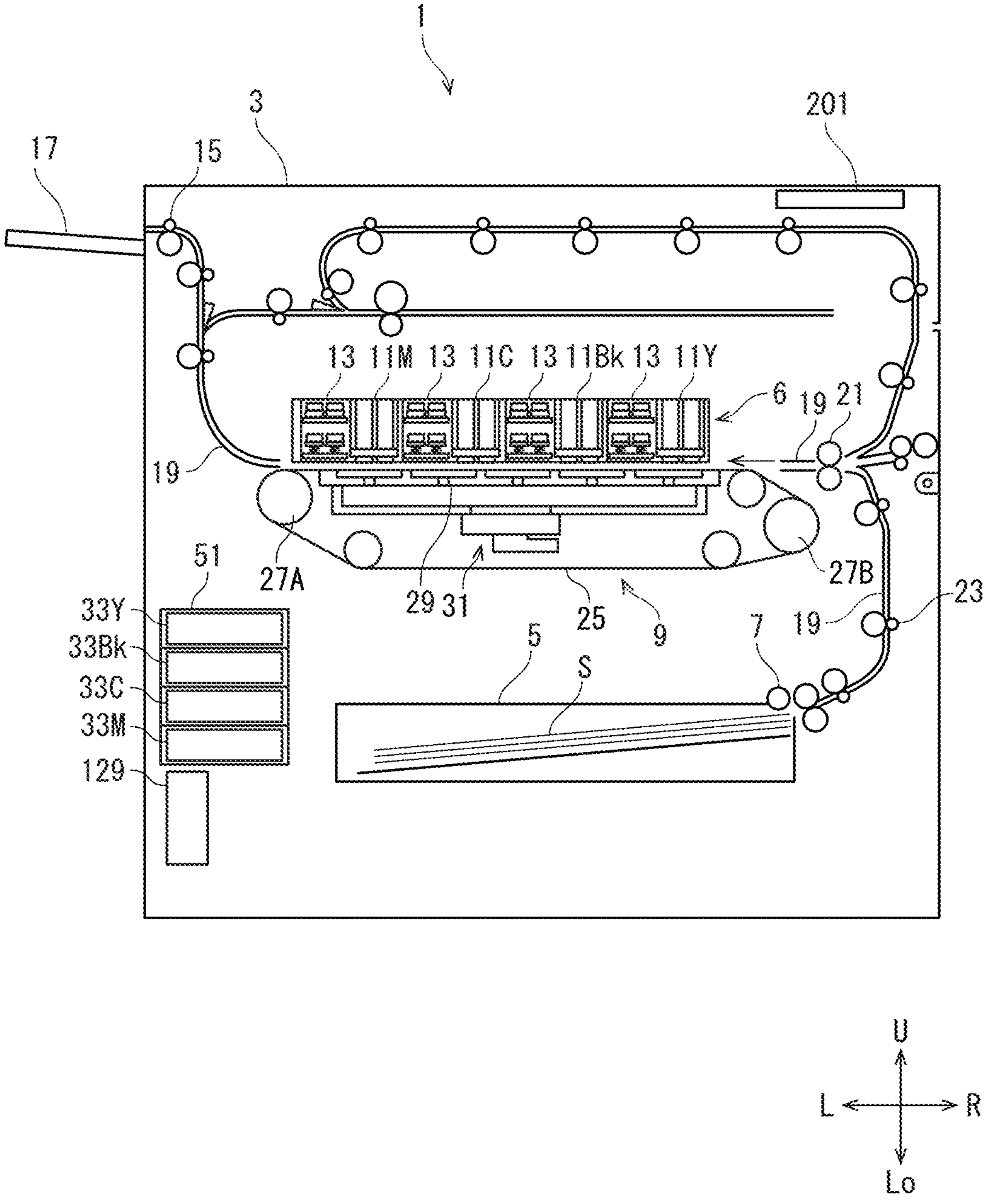
FIG. 1 is a front view schematically showing an inner structure of an inkjet recording apparatus according to one embodiment of the present disclosure.
Figure 2A:
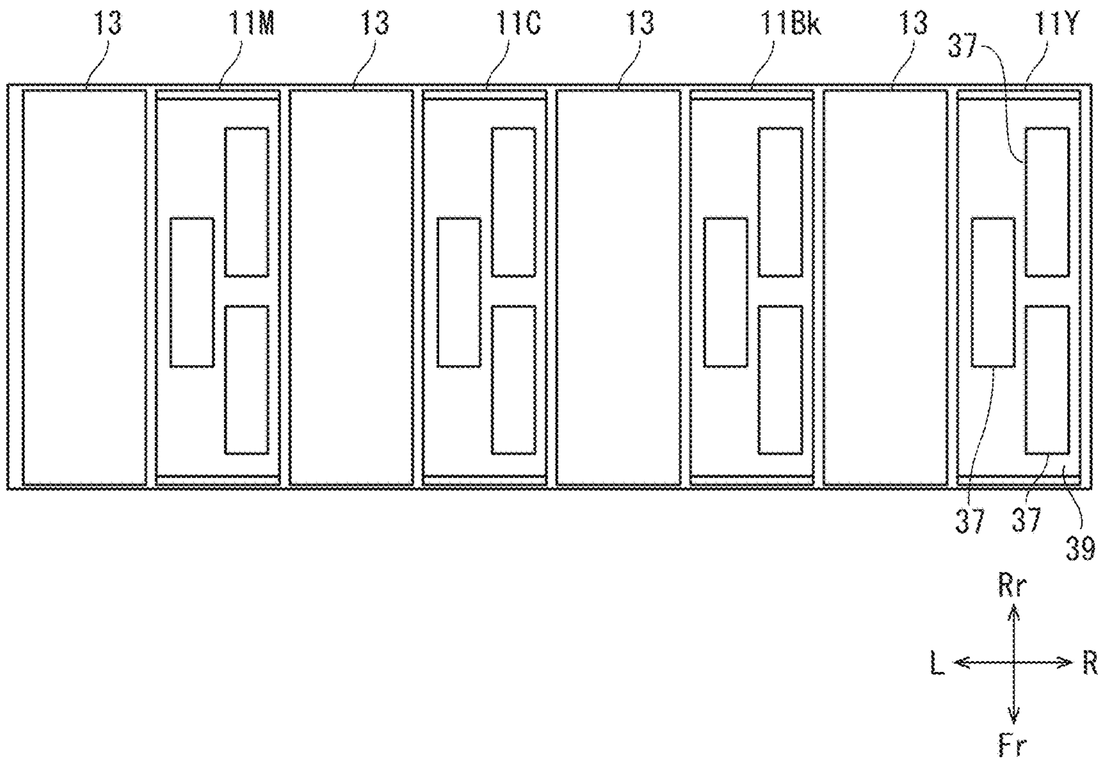
FIG. 2A is a plan view schematically showing head units and maintenance devices of the inkjet recording apparatus according to the embodiment of the present disclosure.
Figure 2B:
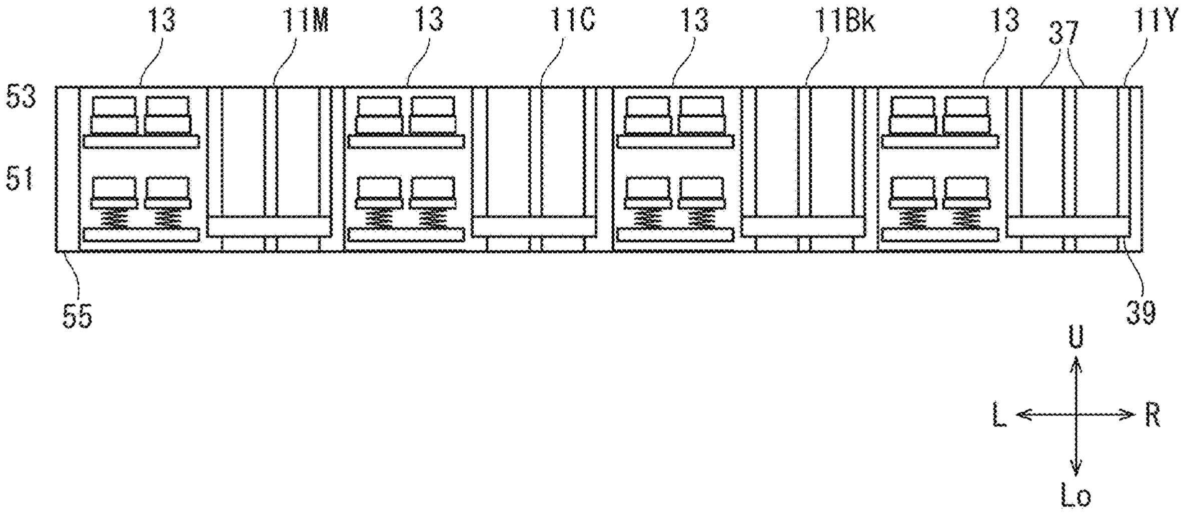
FIG. 2B is a front view schematically showing the head units and the maintenance devices of the inkjet recording apparatus according to the embodiment of the present disclosure.

First, the entire structure of the inkjet recording apparatus 1 will be described with reference to FIG. 1, FIG. 2A, and FIG. 2B. FIG. 1 is a front view schematically showing the inside of the inkjet recording apparatus 1. FIG. 2A is a plan view schematically showing head units 11 and maintenance devices 13, and FIG. 2B is a side view schematically showing the head units 11 and the maintenance devices 13. Hereinafter, the front side of the paper plane on which FIG. 1 is drawn is defined as the front side of the inkjet recording apparatus 1. In each figure, U, Lo, L, R, Fr, and Rr indicate the upper, lower, left, right, front, and rear, respectively.

The inkjet recording apparatus 1 (see FIG. 1) is an inkjet image forming apparatus that forms an image by ejecting ink. The inkjet recording apparatus 1 includes a rectangular body housing 3. In the lower portion of the inside of the body housing 3, a sheet feeding cassette 5 in which a sheet S such as a plain paper and a coated paper is stored, and a sheet feeding roller 7 which feeds the sheet S from the sheet feeding cassette 5 are provided. Above the sheet feeding cassette 5, a conveying unit 9 which conveys the sheet S is provided. Above the conveying unit 9, four head units 11M, 11C, 11Bk, and 11Y (collectively referred to as the head unit 11) and four maintenance devices 13 (see also FIG. 2A and FIG. 2B) are provided. In the left and upper portion of the body housing 3, a discharge rollers pair 15 which discharges the sheet S having a formed image and a discharge tray 17 on which the discharged sheet S is stacked are provided.

Inside the body housing 3, a conveyance path 19 is formed from the sheet feeding cassette 5 through the conveying unit 9 to the discharge rollers pair 15. On the conveyance path 19, a plurality of conveying rollers pairs 21 which convey the sheet S is provided. On the conveyance path 19, a registration rollers pair 23 is provided on the upstream side of the conveying unit 9 in the conveying direction.

The conveying unit 9 will be described with reference to FIG. 1. The conveying unit 9 is provided with an endless conveying belt 25. The conveying belt 25 has a number of through-holes (not shown) penetrating in the thickness direction. The conveying belt 25 is wound around a driving roller 27A and a driven roller 27B disposed via an interval in the left-and-right direction. The driving roller 27A is driven by a motor (not shown) to be rotated. As the driving roller 27A is rotated, the conveying belt 25 travels in the counterclockwise direction of FIG. 1. The conveying belt 25 traveling along an upper track forms the conveyance path 19 along which the sheet S is conveyed in the conveying direction from the right to the left in FIG. 1.

In the hollow space of the conveying belt 25, a conveyance plate 29 and a suction device 31 are provided. The conveyance plate 29 has a number of through-holes penetrating in the thickness direction. The conveyance plate 29 is in contact with the inner surface of the conveying belt 25 traveling along the upper track. The suction device 31 is provided below the conveyance plate 29, and attracts the sheet S to the conveying belt 25 by sucking air through the through-holes of the conveying belt 25 and the through-holes of the conveyance plate 29.

Next, the head unit 11 will be described. The four head units 11Y, 11Bk, 11C, and 11M correspond to yellow, black, cyan, and magenta inks, respectively, and are disposed above the conveying belt 25 at predetermined intervals along the conveying direction. Ink containers 33Y, 33Bk, 33C, and 33M (collectively referred to as the ink container 33, see FIG. 1) filled with the yellow, black, cyan, and magenta inks, respectively, are connected to the four head units 11. As shown in FIG. 2A and FIG. 2B, each head unit 11 includes three inkjet heads 37 and a plate 39 for supporting the three inkjet heads 37. The ink is supplied to the three inkjet heads 37 from the respective ink containers 33.

Figure 3A:
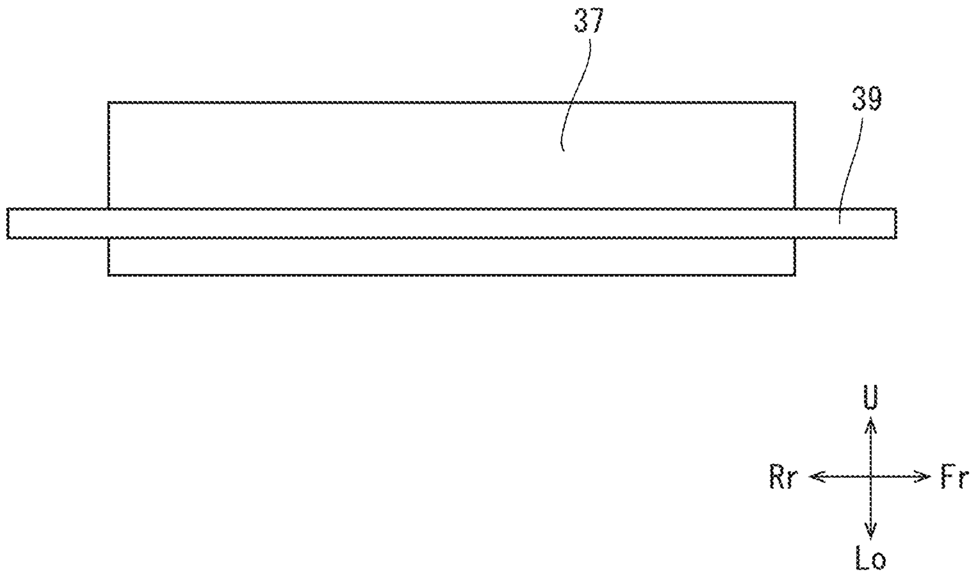
FIG. 3A is a side view showing an inkjet head of the inkjet recording apparatus according to the embodiment of the present disclosure.
Figure 3B:
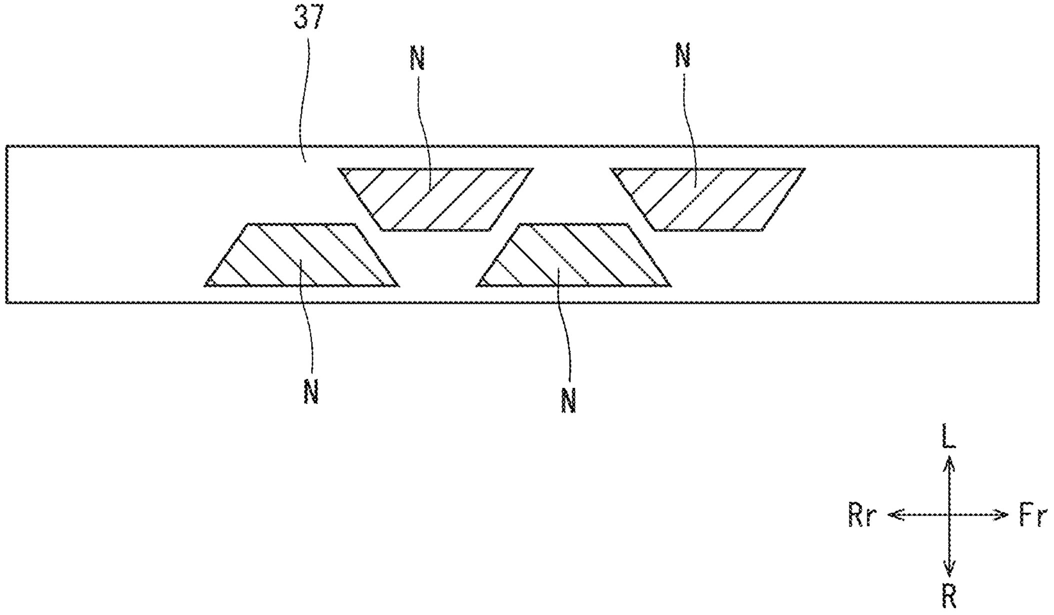
FIG. 3B is a bottom view showing the inkjet head of the inkjet recording apparatus according to the embodiment of the present disclosure.

The inkjet head 37 will be described with reference to FIG. 3A and FIG. 3B. FIG. 3A is a side view showing the inkjet head 37, and FIG. 3B is a bottom view showing the inkjet head 37. The inkjet head 37 has a rectangular parallelepiped shape elongated in a width direction (the front-and-rear direction) intersecting the conveying direction of the sheet S. The inkjet head 37 has a large number of nozzles (not shown) to which the ink is supplied, and a piezoelectric element (not shown) provided for each nozzle. The ejection ports of the nozzles are opened on the lower surface of the inkjet head 37. When the piezoelectric element is driven, the ink in the nozzle is ejected downward through the ejection port of the nozzle. As shown in FIG. 3B, the region where the ejection ports are opened refers to as a nozzle surface N.

The three inkjet heads 37 are arranged in a staggered pattern along the width direction, as shown in FIG. 2A, and are supported on the plate 39 such that the lower end portion protrudes downward from the plate 39, as shown in FIG. 3A.

Each head unit 11 is supported by a head unit moving mechanism 41 (not shown in FIG. 1, FIG. 2A and FIG. 2B, see FIG. 9) to be moved in the upper-and-lower direction between a printing position and a retracted position. The printing position is a position where the nozzle surface N of the inkjet head 37 of each head unit 11 faces the conveying belt 25 traveling along the upper track with a predetermined interval (for example, 1 mm) (see FIG. 1). The retracted position is a position where the head unit 11 is separated more upward than the printing position to form a space in which a cap unit 51 and a wipe unit 53 of the maintenance device 13, which will be described later, can be housed above the conveying unit 9. The printing position is a home position of the head unit 11. The head unit moving mechanism 41 (see FIG. 9) is electrically connected to a control part 201 (see FIG. 1 and FIG. 9).

Figure 4:
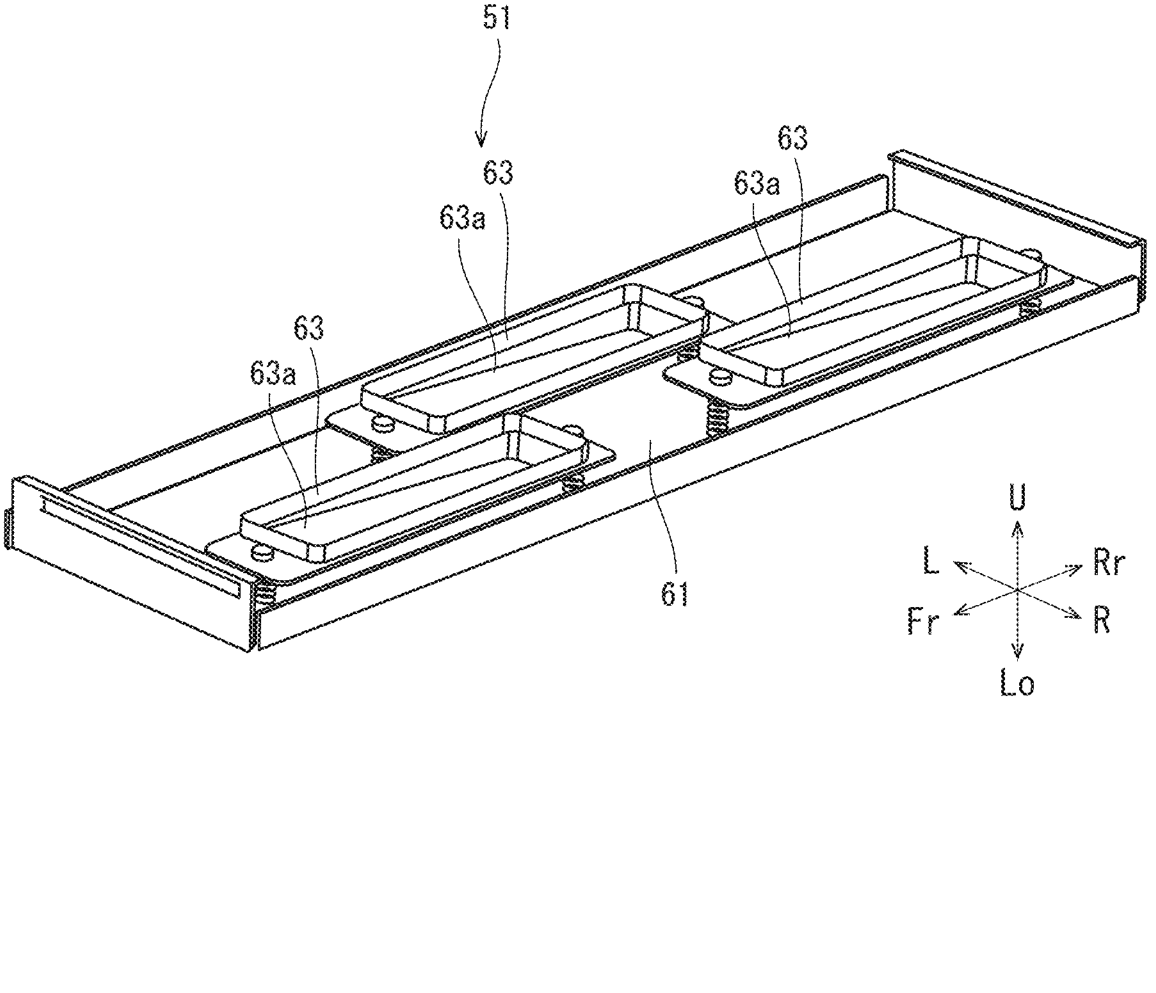
FIG. 4 is a perspective view showing a cap unit of the inkjet recording apparatus according to the embodiment of the present disclosure.
Figure 5:
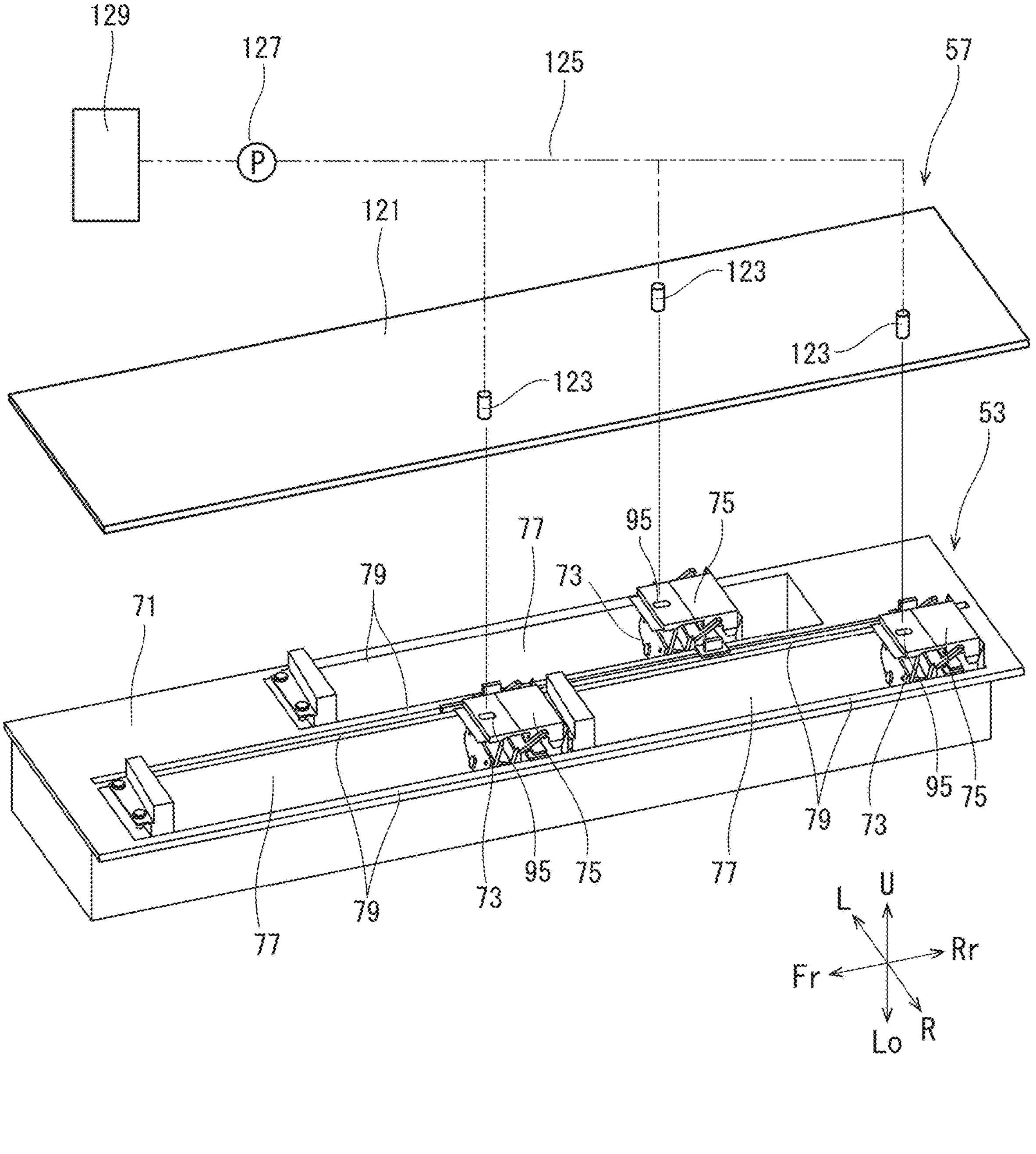
FIG. 5 is a perspective view showing a wipe unit and a cleaning liquid supply mechanism of the inkjet recording apparatus according to the embodiment of the present disclosure.

Next, the maintenance device 13 will be described with reference to FIG. 4 and FIG. 5. FIG. 4 is a perspective view showing the cap unit 51, and FIG. 5 is a perspective view showing the wipe unit 53 and a cleaning liquid supply mechanism 57. The maintenance device 13 includes the cap unit 51 (see FIG. 4), the wipe unit 53 (see FIG. 5), a housing 55 (see FIG. 2A and FIG. 2B) in which the cap unit 51 and the wipe unit 53 are housed, and the cleaning liquid supply mechanism 57 (see FIG. 5) which supplies a cleaning liquid to the wipe unit 53. The maintenance device 13 is provided for each head unit 11, and is arranged adjacent to the corresponding head unit 11 in the conveying direction. In this example, as shown in FIG. 2A and FIG. 2B, the head unit is arranged on the left side (the downstream side in the conveying direction of the sheet S) of the corresponding head unit 11.

First, the housing 55 (see FIG. 2B) will be described. The housing 55 has a rectangular parallelepiped shape elongated in the width direction. The upper surface and the right surface of the housing 55 (the surface facing the corresponding head unit 11) are opened. The maintenance device 13 may be arranged on the right side (the upstream side in the conveying direction) of the corresponding head unit 11. In this case, the left surface of the housing 55 is opened.

Next, the cap unit 51 will be described with reference to FIG. 4. The cap unit 51 includes a support plate 61 and three caps 63 supported on the support plate 61. The support plate 61 has a rectangular shape elongated in the width direction. The three caps 63 are arranged in a staggered pattern along the width direction, in the same manner as the three inkjet heads 37 of the head unit 11. Each cap 63 includes a recess 63*a* having an open upper surface, and a discharge port (not shown) provided at the bottom of the recess 63*a*. The recess 63*a* has a size that surrounds the nozzle surface N of one inkjet head 37.

The cap unit 51 is housed in the lower space of the housing 55 as shown in FIG. 2B. The cap unit 51 can be moved between a separated position (see FIG. 2B) housed in the housing 55 and a capping position pulled out from the housing 55 rightward through the opening of the housing 55 by a cap unit moving mechanism (not shown).

Next, the wipe unit 53 and the cleaning liquid supply mechanism 57 will be described with reference to FIG. 5. First, the wipe unit 53 will be described. The wipe unit 53 includes a support plate 71, three carriages 73, three cleaning liquid supply members 75, and three waste liquid trays 77.

The support plate 71 is provided with three pairs of rails 79 along the width direction. The three pairs of rails 79 are arranged in a staggered pattern along the width direction, in the same manner as the three inkjet heads 37 of the head unit 11.

Figure 6A:
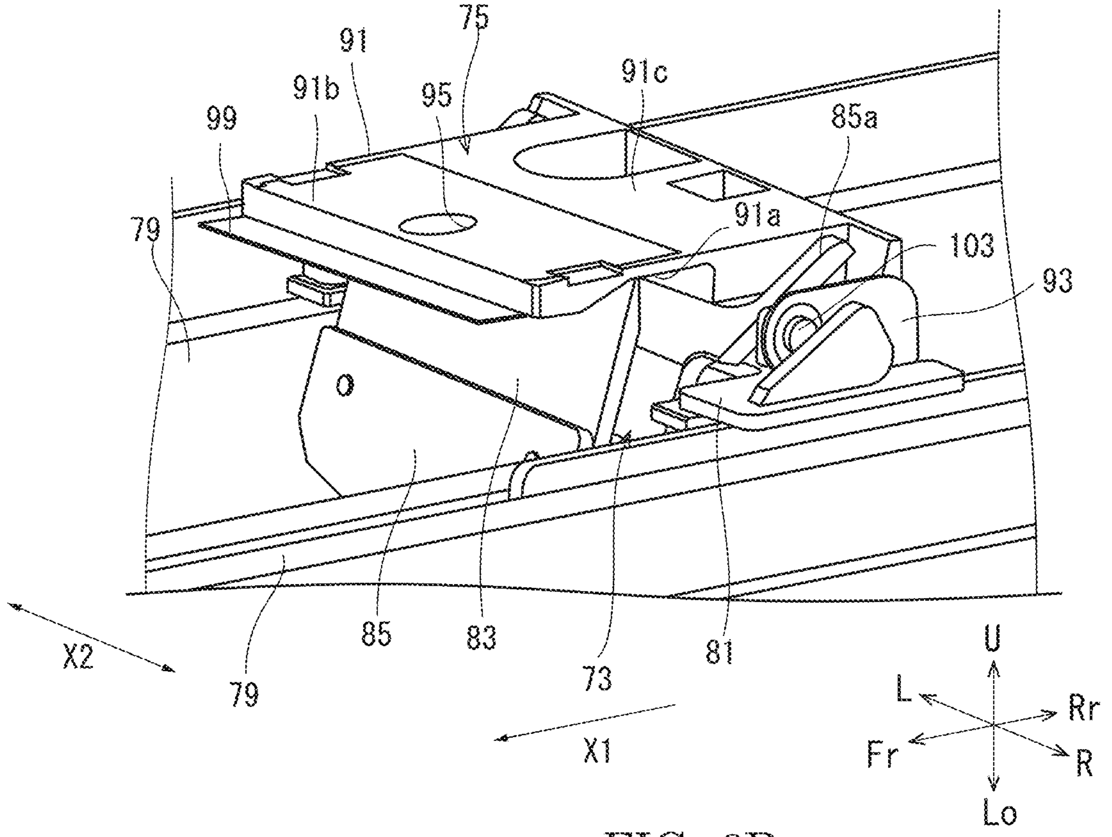
FIG. 6A is a perspective view showing a carriage and a cleaning liquid supply member of the wipe unit of the inkjet recording apparatus according to the embodiment of the present disclosure.
Figure 6B:
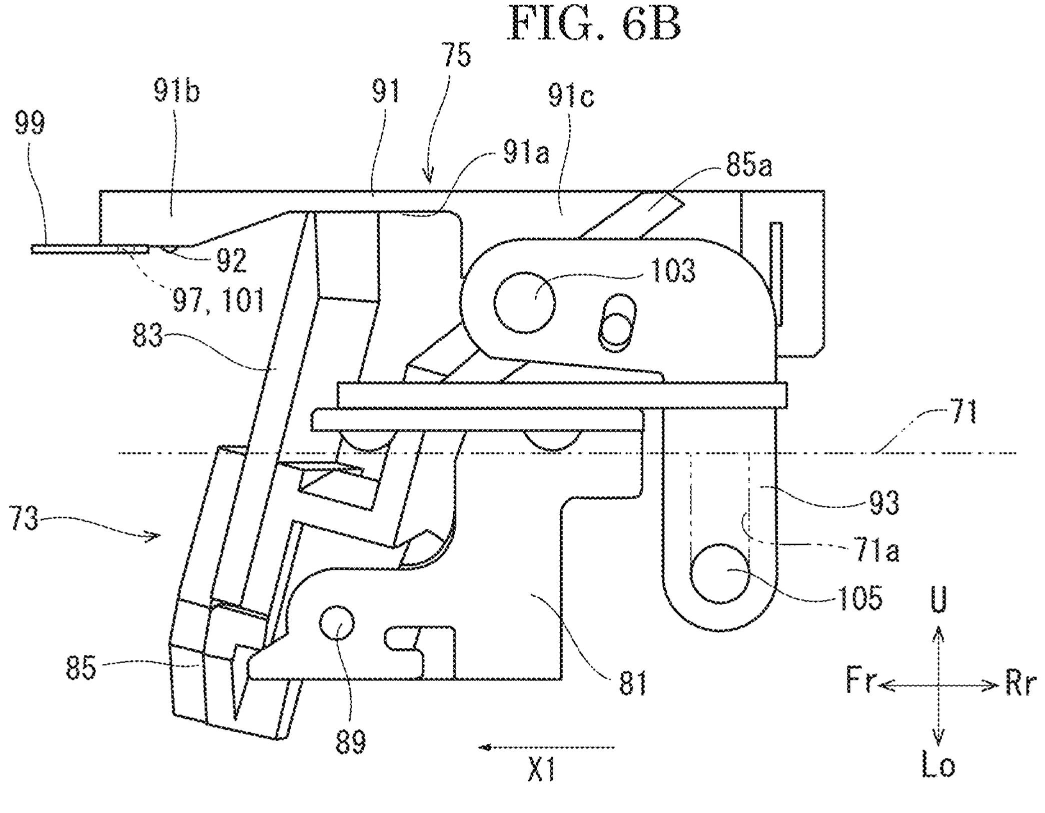
FIG. 6B is a side view showing the carriage and the cleaning liquid supply member of the wipe unit of the inkjet recording apparatus according to the embodiment of the present disclosure.

Next, the carriage 73 and the cleaning liquid supply member 75 will be described with reference to FIG. 6A, FIG. 6B, and FIG. 7. FIG. 6A is a perspective view showing the carriage 73 and the cleaning liquid supply member 75, FIG. 6B is a side view showing the carriage 73 and the cleaning liquid supply member 75. FIG. 7 is a side view schematically showing a cleaning liquid storage member 91 of the cleaning liquid supply member 75.

First, the carriage 73 will be described. As shown in FIG. 6A and FIG. 6B, the carriage 73 includes a moving body 81, a blade 83, and a holder 85 that supports the blade 83 and is supported by the moving body 81. The moving body 81 is engaged with the rails 79 formed on the support plate 71, and can be moved along the rails 79 between a moving start position and a moving end position by a carriage moving mechanism 87 (not shown in FIG. 6A and FIG. 6B, see FIG. 9). The moving start position and the moving end position are positions on both outer sides of the nozzle surface N of the inkjet head 37 in the width direction (the front-and-rear direction). In this example, the moving start position is a position on the rear side of the nozzle surface N, and the moving ending position is a position on the front side of the nozzle surface N. The direction from the moving start position to the moving end position (in this example, the direction from the rear to the front) is defined as a moving direction X1 of the carriage 73. The moving start position is a home position of the carriage 73. The carriage moving mechanism 87 is electrically connected to the control part 201 (see FIG. 9).

The blade 83 is a plate-like member having a width wider than the width of the nozzle surface N, and is made of flexible resin or the like. The blade 83 takes a posture inclined on the upstream side in the moving direction X1 (the front-and-rear direction) and inclined in a blade width direction X2 (the left-and-right direction) intersecting the moving direction X1, and the lower end portion of the blade 83 is supported by the holder 85. The lower end portion of the holder 85 is supported by the moving body 81 so as to be rotatable around a turning shaft 89 (see FIG. 6B) on the upstream side of the blade 83 in the moving direction X1. Thereby, the blade 83 can be turned to the upstream side and the downstream side of the moving direction X1 around the turning shaft 89 together with the holder 85. The holder 85 has a pair of arms 85*a* which extend upward and are spaced apart in the blade width direction X2.

Next, the cleaning liquid supply member 75 will be described. The cleaning liquid supply member 75 is provided separately from the carriage 73, and includes a cleaning liquid storage member 91 and a pair of holders 93 which support the cleaning liquid storage member 91 and are supported by the support plate 71. The cleaning liquid storage member 91 is a rectangular plate-like member, and has a flat upper surface. On the lower surface of the cleaning liquid storage member 91, a recess 91*a* is formed along the blade width direction X2. The downstream side surface of the recess 91*a* in the moving direction X1 is inclined toward the downstream side of the moving direction X1. The cleaning liquid storage member 91 has a tip end portion 91*b* on the downstream side of the recess 91*a* in the moving direction X1 and a base end portion 91*c* on the upstream side of the recess 91*a* in the moving direction X1. The tip end portion 91*b* is formed to be thinner than the base end portion 91*c*.

The tip end portion 91*b* is provided with a hollow space for storing the cleaning liquid. The tip end portion 91*b* has a flat lower surface. The top plate of the tip end portion 91*b* has a supply hole 95 penetrating in the upper-and-lower direction and communicating with the hollow space, and the bottom plate of the tip end portion 91*b* has one or more discharge holes 97 penetrating in the upper-and-lower direction and communicating with the hollow space. The discharge holes 97 are arranged along the blade width direction X2, and opened on the lower surface of the tip end portion 91*b*. On the bottom surface of the hollow space, a mesh member (not shown) is provided. The mesh member is not always provided. Further, on the lower surface of the tip end portion 91*d*, a sheet member 99 protruding to the downstream side of the moving direction X1 is attached. The sheet member 99 has through-holes 101 (see FIG. 6B) communicating with the discharge holes 97 of the tip end portion 91*b*. The through-holes 101 are opened to the lower surface of the sheet member 99.

Figure 7A:
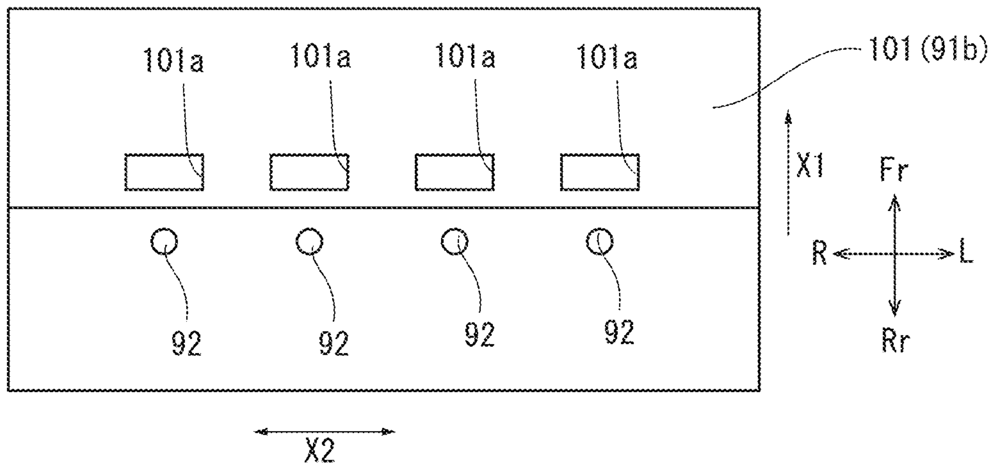
FIG. 7A is a bottom view showing a cleaning liquid storage member of the wipe unit of the inkjet recording apparatus according to the embodiment of the present disclosure.
Figure 7B:
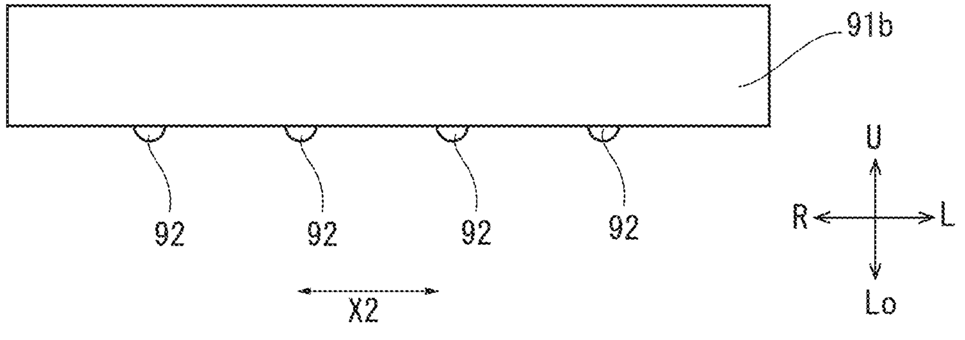
FIG. 7B is a side view showing the cleaning liquid storage member of the wipe unit of the inkjet recording apparatus according to the embodiment of the present disclosure.

As shown in FIG. 7A and FIG. 7B, one protrusion 92 is formed on the lower surface of the tip end portion 91*b* on the upstream side (the rear side) of the opening 101*a* of each through-hole 101 of the sheet member 99 in the moving direction X1. The tip surface of the protrusion 92 is formed in a hemispherical shape (R-plane shape).

Each of the holders 93 is an L-shaped plate-like member viewed from the side surface. One end portion of the holder 93 is rotatably supported on the side surface of the base end portion 91*c* of the cleaning liquid storage member 91 within a predetermined range around a turning shaft 103. The other end portion of the holder 93 is rotatably supported on the support plate 71 around a turning shaft 105 (see FIG. 6B) on the upstream side of the carriage 73, which is moved to the moving start position, in the moving direction X1. Specifically, the turning shaft 105 is housed in a recess 71*a* provided in the support plate 71. As a result, the holder 93 can be turned upward and downward around the turning shaft 105, and when it is turned upward, the cleaning liquid storage member 91 is turned upward together with the holder 93, and when it is turned downward, the cleaning liquid storage member 91 is turned downward together with the holder 93. A torsional coil spring (not shown) is fitted around the turning shaft 105. The torsional coil spring biases the holder 93 to be turned downward. The arms 85*a* of the holder 85 of the carriage 73 extend upward through the spaces between the base end portion 91*c* of the cleaning liquid storage member 91 and the holders 93.

Figure 8A:
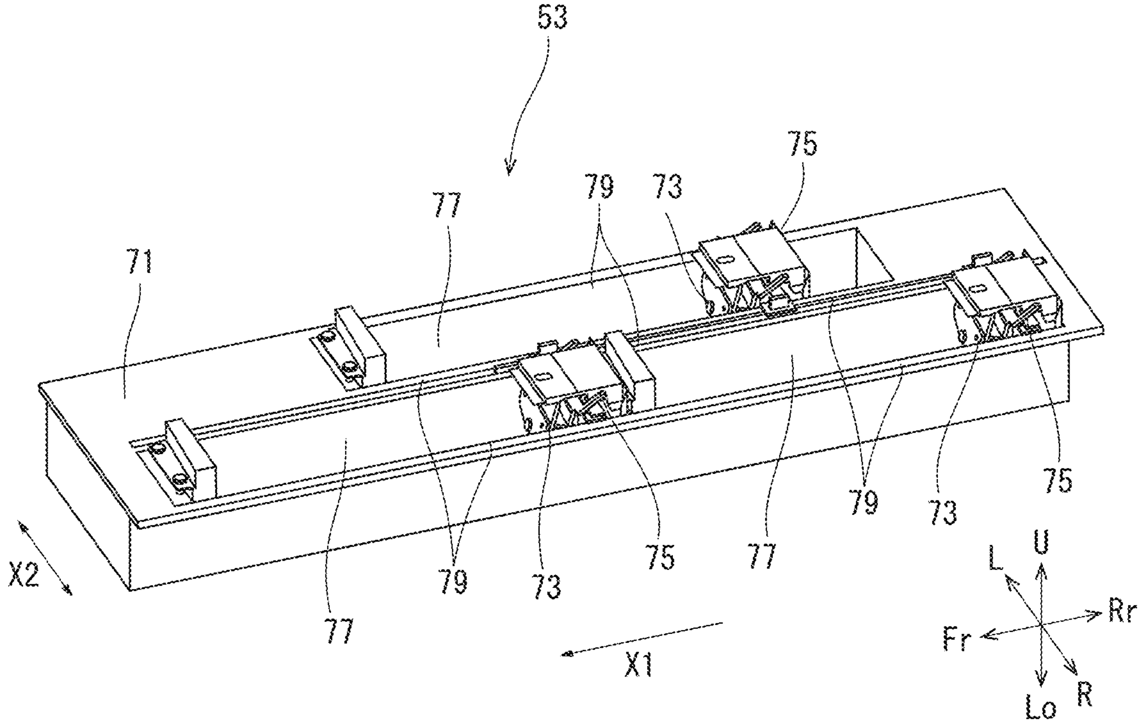
FIG. 8A is a perspective view showing the carriages moved to a moving start position, in the wipe unit of the inkjet recording apparatus according to the embodiment of the present disclosure.
Figure 8B:
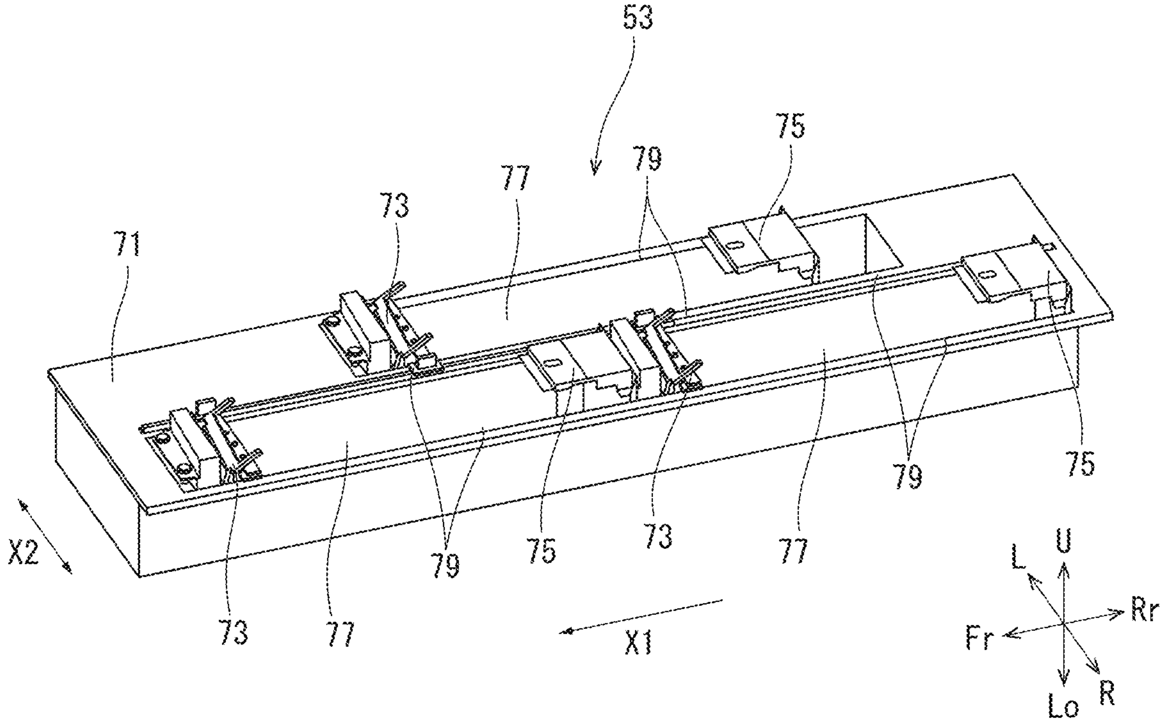
FIG. 8B is a perspective view showing the carriages moved to a moving end position, in the wipe unit of the inkjet recording apparatus according to the embodiment of the present disclosure.

The movement of the carriage 73 will be described with reference to FIG. 8A and FIG. 8B. FIG. 8A and FIG. 8B are perspective views showing the wipe unit 53. FIG. 8A shows the carriages 73 moved to the moving start position, and FIG. 8B shows the carriages 73 moved to the moving end position. As shown in FIG. 8A, when the carriage 73 is moved to the moving start position, the tip of the blade 83 is accommodated in the recess 91*a* of the cleaning liquid storage member 91 (see also FIG. 6A and FIG. 6B). The carriage 73 is moved from the moving start position to the moving end position shown in FIG. 8B by a carriage moving mechanism 87 (see FIG. 10). Since the cleaning liquid supply member 75 is immovably supported by the support plate 71 as described above, the cleaning liquid supply member 75 does not move even if the carriage 73 is moved.

As shown in FIG. 2B, the wipe unit 53 is housed in the upper space of the housing 55. The wipe unit 53 can be moved from a separated position housed in the housing 55 (see FIG. 2B) to a wiping position pulled out rightward from the housing 55 through the opening of the housing 55 by a wipe unit moving mechanism 111 (not shown in FIG. 2B, see FIG. 10). As will be described later, at the wiping position, each blade 83 of the wipe unit 53 can be in contact with the nozzle surface N of the inkjet head 37, and at the separated position, each blade 83 of the wipe unit 53 is separated from the nozzle surface N of the inkjet head 37. The separated position is a home position of the wipe unit 53. The wipe unit moving mechanism 111 is electrically connected to the control part 201 (see FIG. 10).

Figure 9A:
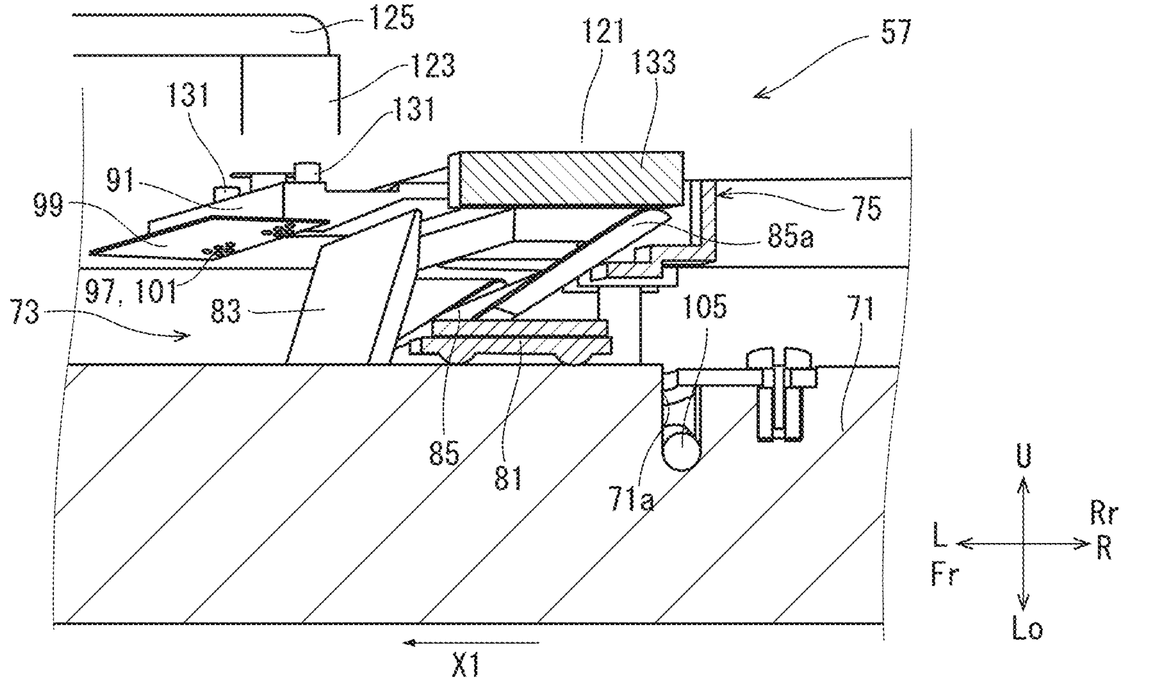
FIG. 9A is a side view showing the cleaning liquid supply mechanism moved to a supply position, in the wipe unit of the inkjet recording apparatus according to the embodiment of the present disclosure.
Figure 9B:
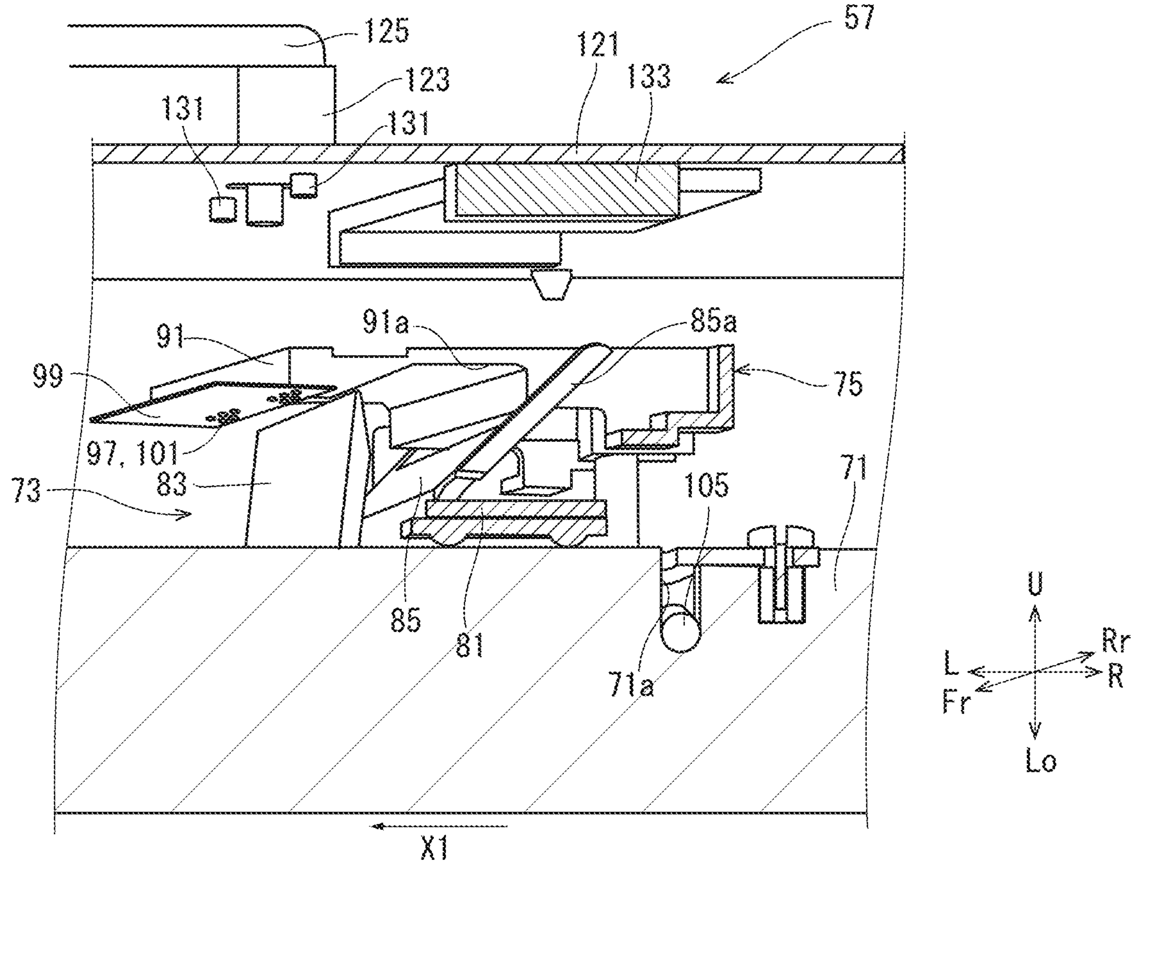
FIG. 9B is a side view showing the cleaning liquid supply mechanism moved to a separated position, in the wipe unit of the inkjet recording apparatus according to the embodiment of the present disclosure.

Next, the cleaning liquid supply mechanism 57 will be described with reference to FIG. 5, FIG. 9A and FIG. 9B. FIG. 9A and FIG. 9B are side views showing the cleaning liquid supply mechanism 57 moved to a separated position and a supply position.

The cleaning liquid supply mechanism 57 supplies the cleaning liquid (for example, water) to each cleaning liquid supply member 75 of the wipe unit 53. As shown in FIG. 5, the cleaning liquid supply mechanism 57 includes a support plate 121 and three supply pipes 123 supported on the support plate 121. The support plate 121 is a rectangular member having the same size as the support plate 71 of the wipe unit 53. The three supply pipes 123 are arranged so as to correspond to the supply holes 95 of the cleaning liquid storage members 91 of the three cleaning liquid supply members 75 of the wipe unit 53, and the lower end portion of the supply pipe 123 protrudes downward from the support plate 121. The upper end portions of the three supply pipes 123 are connected to pipes 125. The pipes 125 are connected to a cleaning liquid tank 129 via a pump 127. When the pump 127 is driven, the cleaning liquid is pumped from the cleaning liquid tank 129 and supplied to each supply pipe 123 through the pipes 125. The pump 127 is electrically connected to the control part 201 (see FIG. 10).

Further, as shown in FIG. 9A and FIG. 9B, on the lower surface of the support plate 121, a pair of cylindrical positioning pins 131 are formed on both sides of the supply pipe 123 in the blade width direction X2. Further, on the lower surface of the support plate 121, a pair of rectangular parallelepiped protrusions 133 separated in the blade width direction X2 are formed on the upstream side of the supply pipe 123 in the moving direction X1.

The cleaning liquid supply mechanism 57 is supported by a lifting mechanism 137 (not shown in FIG. 5, FIG. 9A and FIG. 9B, see FIG. 10) so as to be movable in the upper-and-lower direction between a supply position (see FIG. 9A) and a separated position (see FIG. 9B). As shown in FIG. 9A, at the supply position, the positioning pins 131 abut on the upper surface of the tip end portion 91*b* of the cleaning liquid storage member 91, and the lower end portion of the supply pipe 123 is inserted into the supply hole 95 of the cleaning liquid storage member 91. Further, the protrusions 133 push down the arms 85*a* of the holder 85 of the carriage 73. As a result, the holder 85 it turned with respect to the moving body 81, and the blade 83 is inclined to the upstream side of the moving direction X1. The supply position is a home position of the cleaning liquid supply mechanism 57. Further, as shown in FIG. 9B, at the separated position, the lower end portion of each supply pipe 123 is separated upward from the supply hole 95. The lifting mechanism 137 is electrically connected to the control part 201 (see FIG. 10).

As shown in FIG. 5, the waste liquid tray 77 is disposed below the moving area of the carriage 73, and is supported by the support plate 71.

Figure 10:
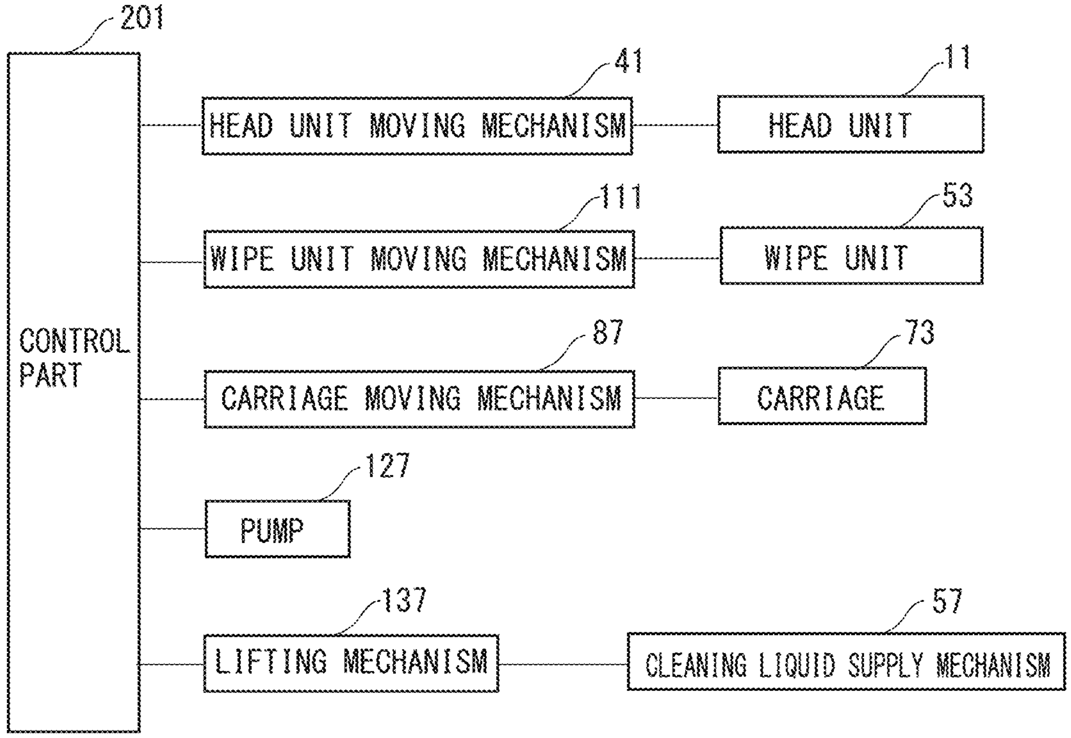
FIG. 10 is a block diagram showing a control part of the inkjet recording apparatus according to the embodiment of the present disclosure.

Next, the control part 201 will be described with reference to FIG. 10. FIG. 10 is a block diagram showing the control part 201. The control part 201 operates the head unit moving mechanism 41 to move the head unit 11 along the upper-and-lower direction to a plurality of positions including the printing position and the retracted position. The control part 201 operates the carriage moving mechanism 87 to move the carriage 73 between the moving start position and the moving end position. The control part 201 operates the wipe unit moving mechanism 111 to move the wipe unit 53 between the wiping position and the separated position along the left-and-right direction. The control part 201 operates the pump 127 to start and stop pumping of the cleaning liquid from the cleaning liquid tank 129. The control unit 201 operates the lifting mechanism 137 to move the cleaning liquid supply mechanism 57 along the upper-and-lower direction to the supply position and the separated position.

In the inkjet recording apparatus 1 having the above configuration, an image forming operation and a wiping operation by the maintenance device 13 will be described mainly with reference to FIG. 11A to FIG. 16. FIG. 11A to FIG. 16 are views schematically showing the wipe unit 53 and the inkjet head 37, the left side of each drawing is a plan view, and the right side of each view is a front view. Description of the capping operation is omitted.

The image forming operation and the wiping operation are performed by the control part 201 controlling each moving mechanism, the pump, and the others. In the initial state, the head unit 11, the wipe unit 53, the carriage 73, and the cleaning liquid supply mechanism 57 are moved to the respective home positions. That is, the head unit 11 is moved to the printing position, the wipe unit 53 is moved to the separated position, the carriage 73 is moved to the moving start position, and the cleaning liquid supply mechanism 57 is moved to the supply position.

First, the image forming operation will be described. When an image forming job is input to the inkjet recording apparatus 1 from an external computer or the like, the sheet S is fed from the sheet feeding cassette 5 to the conveyance path 19 by the sheet feeding roller 7. The fed sheet S is conveyed to the conveying unit 9 at a predetermined timing after the skew is corrected by the registration rollers pair 23. The sheet S is attracted to the conveying belt 25, and conveyed in the conveying direction. At this time, when supplies the control part 201 gradation data corresponding to each nozzle of the head unit 11 to a drive circuit in synchronization with the conveyance of the sheet S, the drive circuit supplies a drive signal corresponding to the gradation data to the piezoelectric element, thereby ejecting the ink drops from the nozzle and forming an image on the sheet S. The sheet S on which the image is formed is discharged to the discharge tray 17 by the discharge rollers pair 15.

In this way, the head unit 11 is moved to the printing position during the image forming operation. As shown in FIG. 3B, each inkjet head 37 of the head unit 11 is not provided with a structure for supplying the cleaning liquid. Therefore, a defect such that the cleaning liquid comes into contact with the sheet S accidentally does not occur.

Figure 11A:
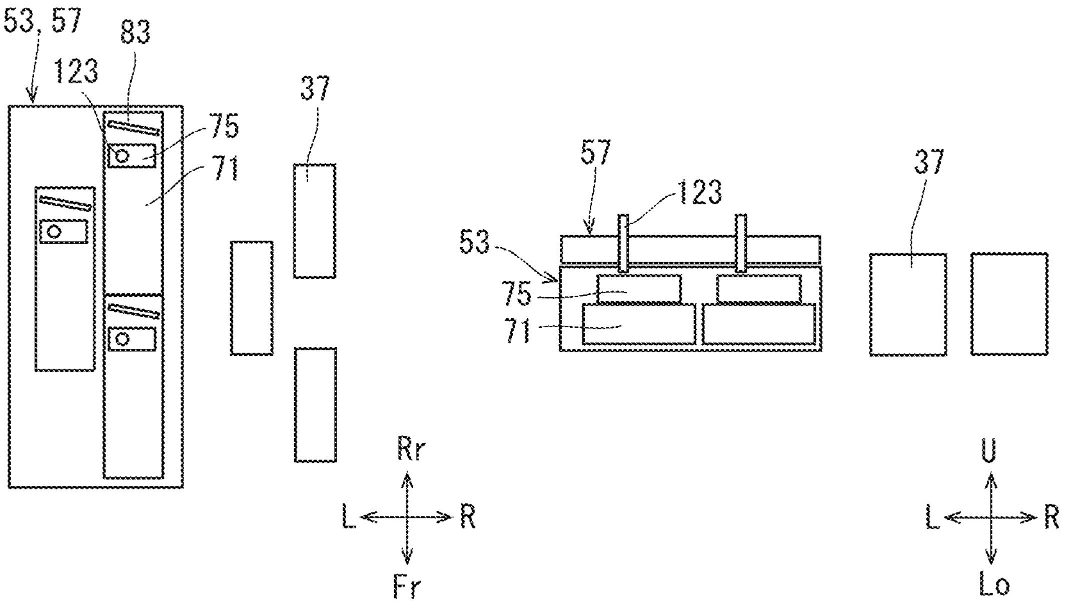
FIG. 11A is a view schematically showing the head unit, the wipe unit, a blade, and the cleaning liquid supply mechanism during a wiping operation (at a home position), in the inkjet recording apparatus according to the embodiment of the present disclosure.

Next, the wiping operation will be described. As shown in FIG. 11A, in the initial state, the wipe unit 53 is moved to the separated position, the carriage 73 (the blade 83) is moved to the moving start position, and the cleaning liquid supply mechanism 57 is moved to the supply position. That is, the lower end portion of each supply pipe 123 of the cleaning liquid supply mechanism 57 is inserted into the supply hole 95 of the cleaning liquid storage member 91 of each cleaning liquid supply member 75 of the wipe unit 53. Further, the protrusions 133 of the cleaning liquid supply mechanism 57 push down the arms 85*a* of the holder 85 of the carriage 73, so that the blade 83 is inclined upstream in the moving direction X1 (see FIG. 9A).

Next, the control part 201 operates the pump 127. Thus, the cleaning liquid is pumped from the cleaning liquid tank 129, and supplied to each supply pipe 123 through the pipes 125. The control part 201 stops driving the pump 127 after a predetermined time has elapsed. The cleaning liquid supplied to each supply pipe 123 is stored in the hollow space of the cleaning liquid storage member 91 through the supply hole 95. The stored cleaning liquid is held by the mesh member, and forms a meniscus L protruding downward from the opening 101*a* of the through-hole 101 of the sheet member 99 through the discharge hole of the tip end portion 91*d* of the cleaning liquid storage member 91 and the through-hole 101.

At this time, when the cleaning liquid may leak out (be discharged) through the openings 101*a*, the cleaning liquid flows through the lower surfaces of the sheet member 99 and the tip end portion 91*b*, gathers at the protrusions 92, and is held in a state of hanging from the protrusions 92. In other words, when the protrusion 92 is not provided, the cleaning liquid leaked from the openings 101*a* tends to move relatively freely along the lower surfaces of the sheet member 99 and the tip end portion 91*b*. Therefore, when the lower surface may be inclined, the leaked cleaning liquid will gather at any one place and fall easily. However, when the protrusions 92 are provided, since the leaked (discharged) cleaning liquid gathers at the protrusions 92, it becomes possible to hold the cleaning liquid uniformly distributed in the blade width direction X2.

Figure 11B:
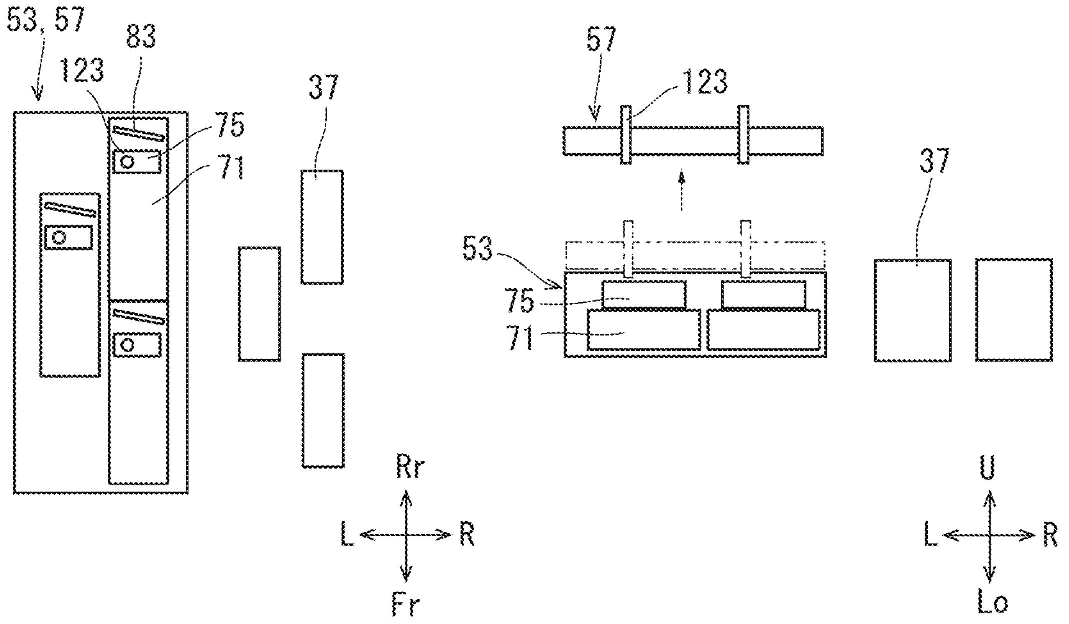
FIG. 11B is a view schematically showing the head unit, the wipe unit, the blade, and the cleaning liquid supply mechanism during the wiping operation (when the cleaning liquid supply mechanism is lifted), in the inkjet recording apparatus according to the embodiment of the present disclosure.
Figure 12A:
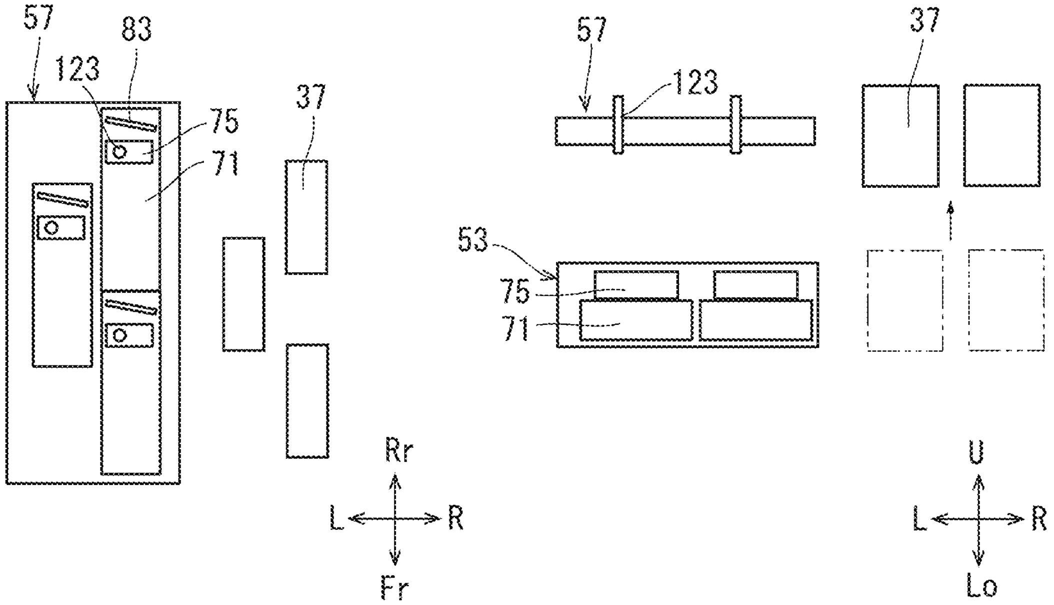
FIG. 12A is a view schematically showing the head unit, the wipe unit, the blade, and the cleaning liquid supply mechanism during the wiping operation (when the head unit is lifted), in the inkjet recording apparatus according to the embodiment of the present disclosure.
Figure 12B:
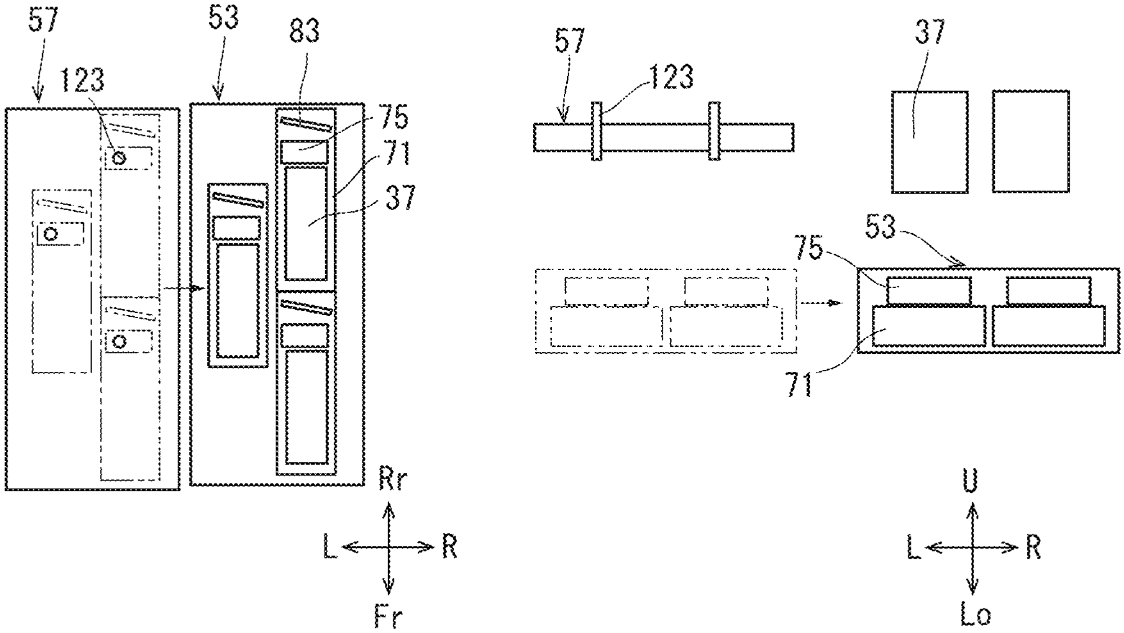
FIG. 12B is a view schematically showing the head unit, the wipe unit, the blade, and the cleaning liquid supply mechanism during the wiping operation (when the wipe unit is moved), in the inkjet recording apparatus according to the embodiment of the present disclosure.

Next, as shown in FIG. 11B, the control part 201 operates the lifting mechanism 137 to lift the cleaning liquid supply mechanism 57 from the supply position to the separated position. As a result, as shown by the double-chained line in FIG. 17C, the supply pipe 123 is separated from the cleaning liquid storage member 91, but the supplied cleaning liquid remains held in the mesh member. Thereafter, as shown in FIG. 12A, the control part 201 operates the head unit moving mechanism 41 to move the head unit 11 (the inkjet head 37) from the printing position to the retracted position. Thereafter, as shown in FIG. 12B, the control part 201 operates the wipe unit moving mechanism 111 to move the wipe unit 53 from the separated position to the wiping position. That is, the wipe unit 53 is separated from the space below the cleaning liquid supply mechanism 57. At this time, the wipe unit 53 is moved while holding the cleaning liquid having the downward protruded meniscus on the openings 101*a* of the through-holes 101 of the sheet member 99.

Figure 13A:
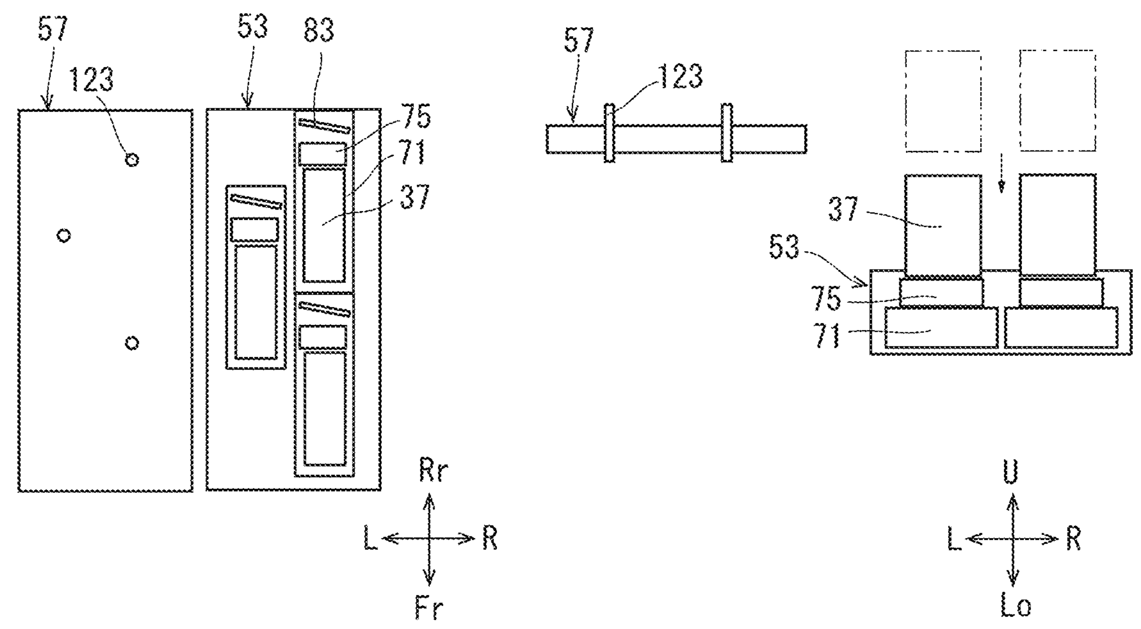
FIG. 13A is a view schematically showing the head unit, the wipe unit, the blade, and the cleaning liquid supply mechanism during the wiping operation (when the head unit is lowered), in the inkjet recording apparatus according to the embodiment of the present disclosure.

Next, as shown in FIG. 13A, the control part 201 operates the head unit moving mechanism 41 to lower the head unit 11 so that the lower surface (the nozzle surface N) of each inkjet head 37 is on the same plane as the lower surface of the tip end portion 91*b* of each cleaning liquid storing member 91 of the wipe unit 53. Then, the carriage 73 of the wipe unit 53 is positioned at the moving start position (a position on the upstream side of the nozzle surface N in the moving direction X1), and the upper surface of the sheet member 99 (see FIG. 6A and FIG. 6B) of the carriage 73 abuts on the lower surface of the inkjet head 37. The sheet member 99 seals a gap between the lower surface of the inkjet head 37 and the lower surface of the tip end portion 91*b* of the cleaning liquid storage member 91.

Figure 13B:
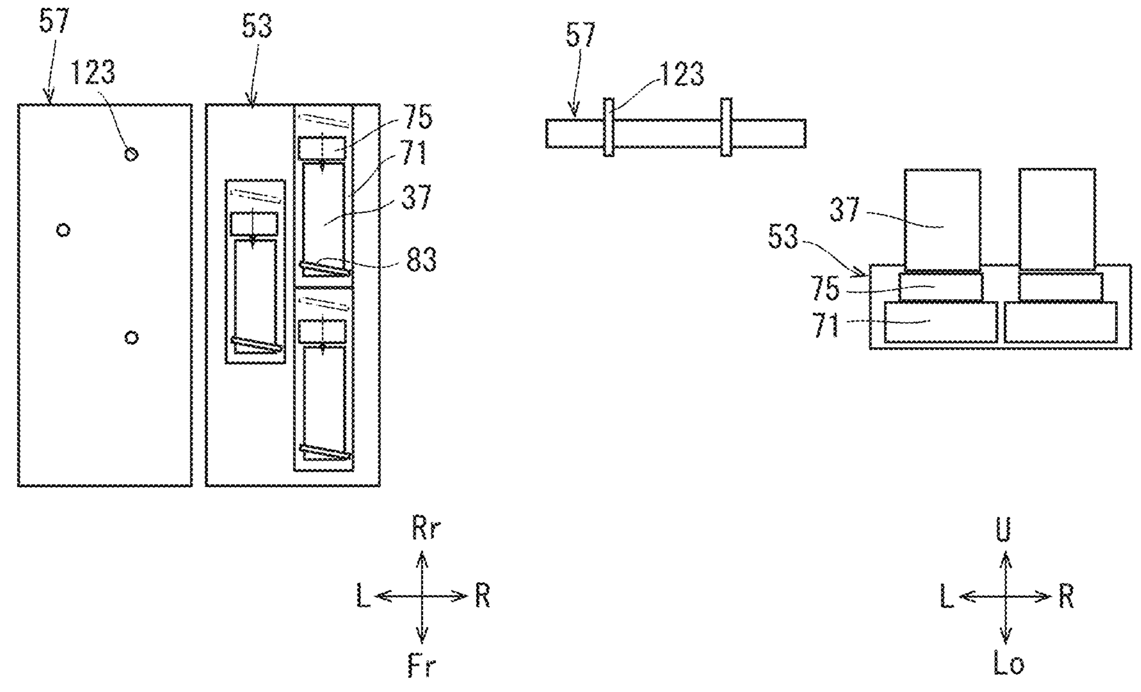
FIG. 13B is a view schematically showing the head unit, the wipe unit, the blade, and the cleaning liquid supply mechanism during the wiping operation (when the carriages are moved), in the inkjet recording apparatus according to the embodiment of the present disclosure.

Next, as shown in FIG. 13B, the control part 201 operates the carriage moving mechanism 87 to move the carriage 73 from the moving start position to the moving end position. Then, the blade 83 is moved together with the carriage 73. The blade 83 first elastically deforms and bends to the upstream side in the moving direction X1 along the side surface of the recess 91*a* of the cleaning liquid storage member 91, and when it reaches the lower surface of the tip end portion 91*b*, wipes off the cleaning liquid hanging from the protrusions 92 and then the cleaning liquid having the downward protruded meniscus held in the openings 101*a*. At this time, the tip end portion 91*b* of the cleaning liquid storage member 91 is pushed up by the blade 83, the cleaning liquid storage member 91 is turned upward with respect to the holder 93 around the turning shaft 103, and the holder 93 is turned upward around the turning shaft 105 (see FIG. 6A and FIG. 6B).

Thereafter, the blade 83 is moved along the nozzle surface N of the inkjet head 37 through the sheet member 99 together with the cleaning liquid. Then, the ink adhered on the nozzle surface N is wiped off. The wiped ink and cleaning liquid falls into the lower waste liquid tray 77. As described above, the cleaning liquid supply member 75 has not moved. When the blade 83 is separated from the sheet member 99, the holder 93 is biased by the torsion coil spring and turned downward.

Figure 14A:
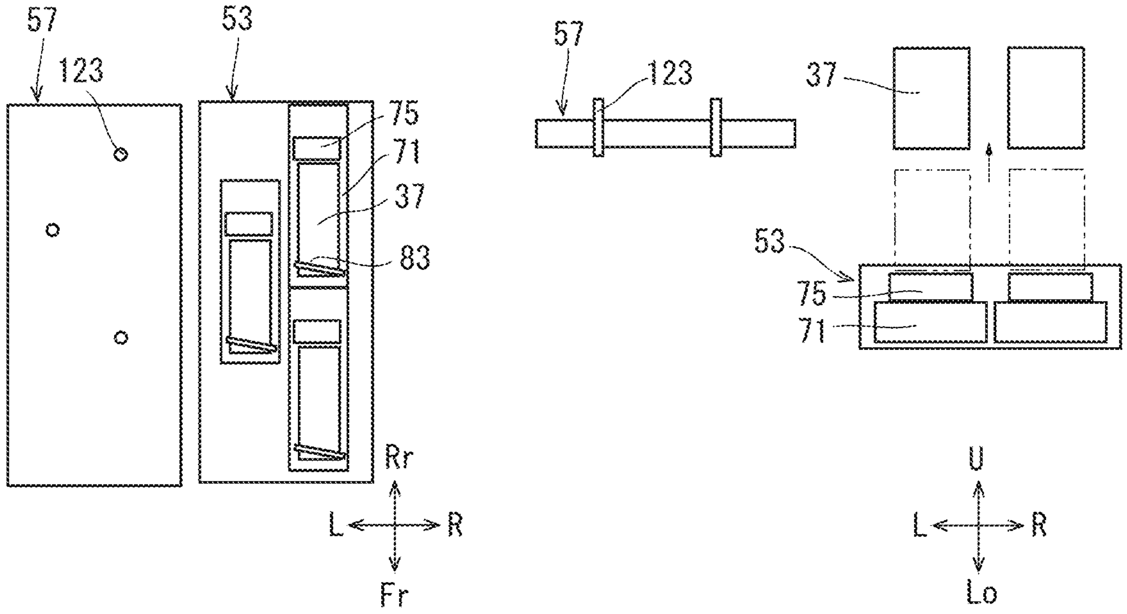
FIG. 14A is a view schematically showing the head unit, the wipe unit, the blade, and the cleaning liquid supply mechanism during the wiping operation (when the head unit is lifted), in the inkjet recording apparatus according to the embodiment of the present disclosure.
Figure 14B:
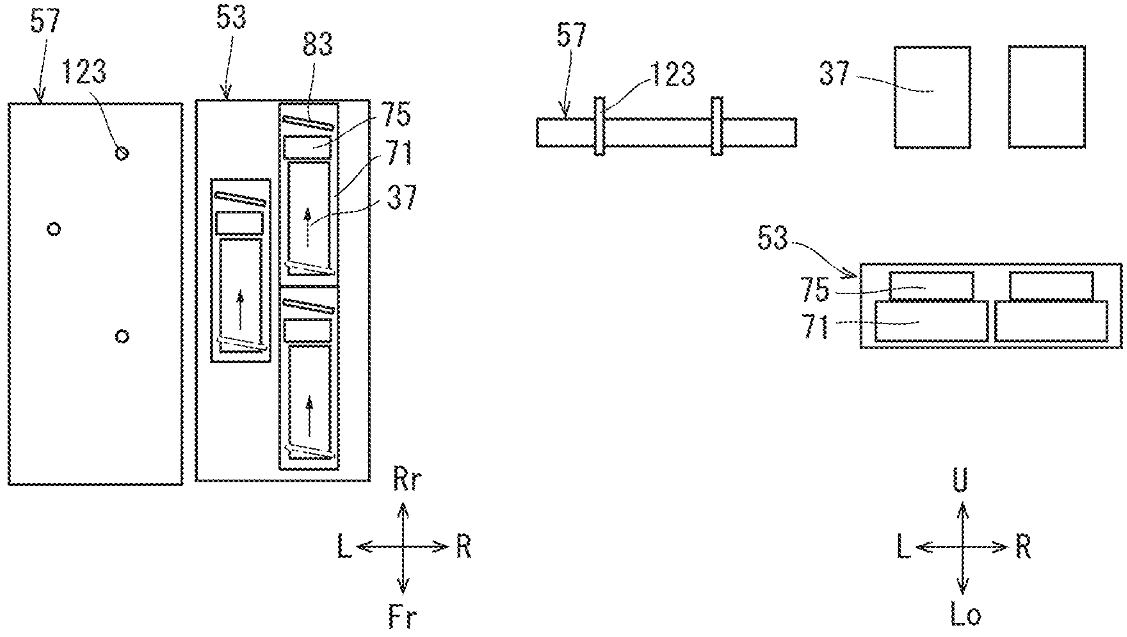
FIG. 14B is a view schematically showing the head unit, the wipe unit, the blade, and the cleaning liquid supply mechanism during the wiping operation (when the carriages are moved), in the inkjet recording apparatus according to the embodiment of the present disclosure.

Next, as shown in FIG. 14A, the control part 201 operates the head unit moving mechanism 41 to move the head unit 11 (the inkjet head 37) to the retracted position. Thus, the nozzle surface N of each inkjet head 37 is separated upward from the blade 83. Thereafter, as shown in FIG. 14B, the control part 201 operates the carriage moving mechanism 87 to return the carriage 73 from the moving end position to the moving start position. Thereafter, the aforementioned wiping operation may be repeated as necessary.

Figure 15A:
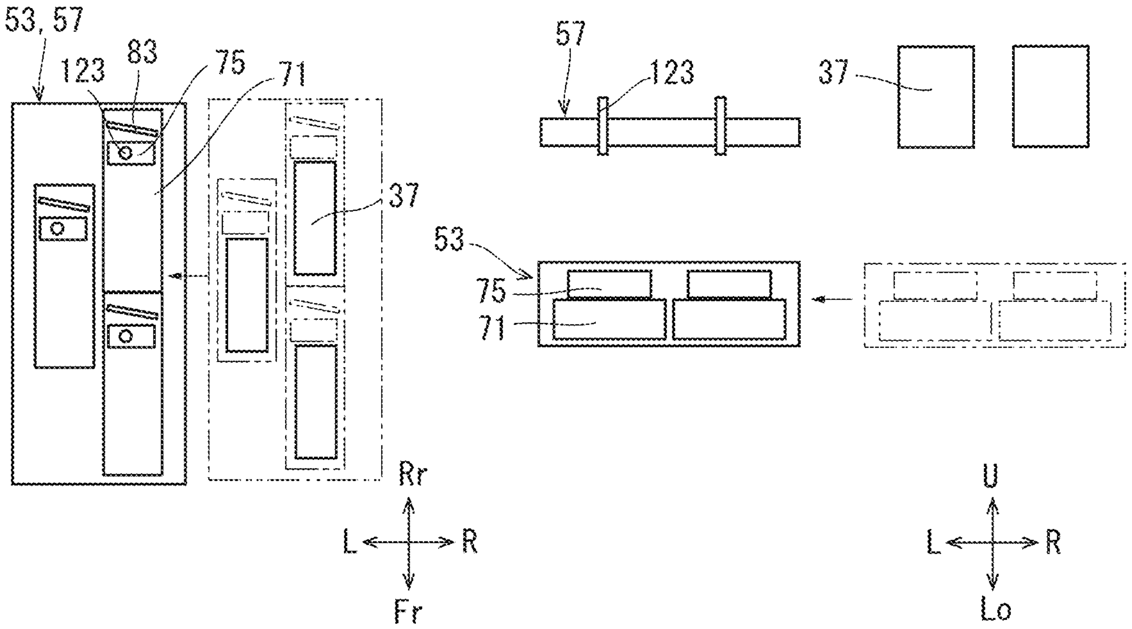
FIG. 15A is a view schematically showing the head unit, the wipe unit, the blade, and the cleaning liquid supply mechanism during the wiping operation (when the wipe unit is moved), in the inkjet recording apparatus according to the embodiment of the present disclosure.
Figure 15B:
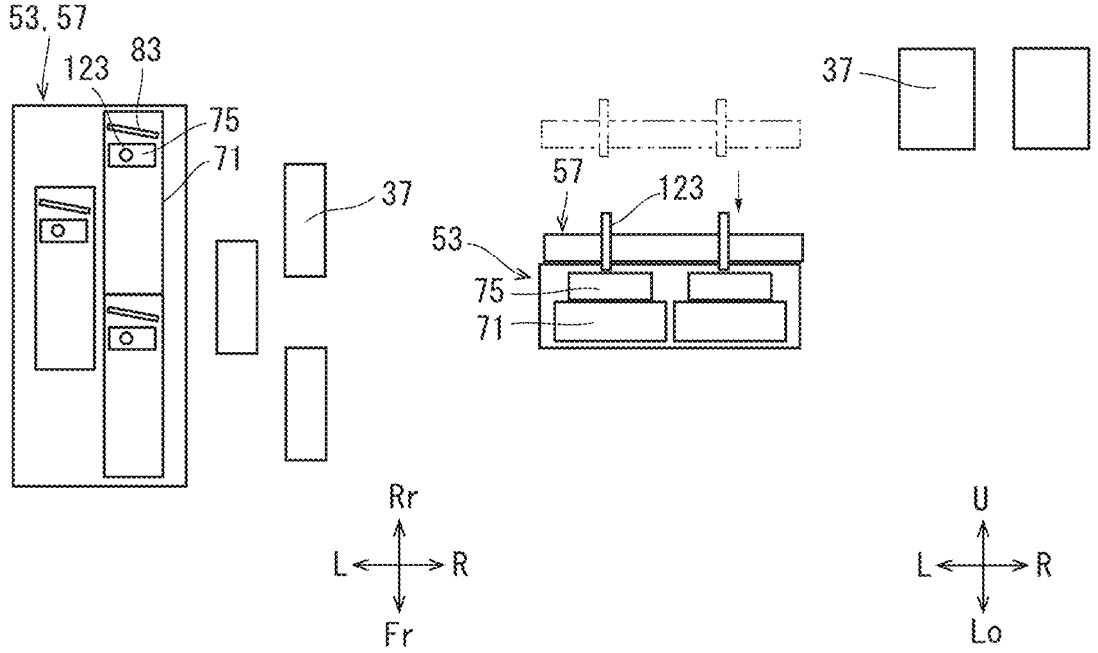
FIG. 15B is a view schematically showing the head unit, the wipe unit, the blade, and the cleaning liquid supply mechanism during the wiping operation (when the cleaning liquid supply mechanism is lowered), in the inkjet recording apparatus according to the embodiment of the present disclosure.
Figure 16:
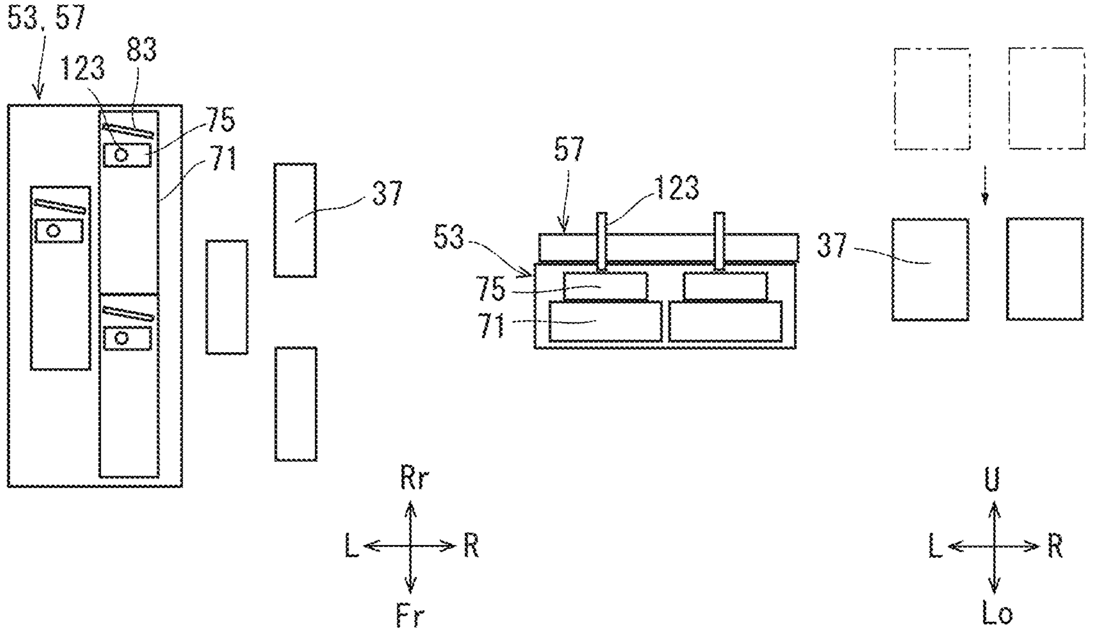
FIG. 16 is a view schematically showing the head unit, the wipe unit, the blade, and the cleaning liquid supply mechanism during the wiping operation (when the head unit is lowered), in the inkjet recording apparatus according to the embodiment of the present disclosure.

After the wiping operation is finished, as shown in FIG. 15A, the control part 201 operates the wipe unit moving mechanism 111 to move the wipe unit 53 from the wiping position to the separated position (the home position), and then the control part 201 operates the lifting mechanism 137 to lower the cleaning liquid supply mechanism 57 from the separated position to the supply position (the home position), as shown in FIG. 15B. Next, as shown in FIG. 16, the control part 201 operates the head unit moving mechanism 41 to lower the head unit 11 (the inkjet head 37) from the retracted position to the printing position (the home position).

As described above, according to the present disclosure, the cleaning liquid leaked out (discharged) from the openings 101*a* of the cleaning liquid supply surface gathers at the protrusions 92 and held hanging from the protrusions 92. Therefore, the leaked (discharged) cleaning liquid does not move in any direction and then fall. Since the protrusions 92 are arranged along the blade width direction X2, the cleaning liquid can be uniformly distributed and held in the blade width direction X2. Therefore, the same amount of cleaning liquid can be supplied in the blade width direction X2.

Since the tip end surface of the protrusion 92 is hemispherical, the blade 83 is hardly damaged when the blade 83 comes into contact with it. Further, the blade 83 wipes the cleaning liquid held in the opening 101*a* after wiping the cleaning liquid held in the protrusions 92. The amount of the cleaning liquid held in the protrusions 92 is smaller than the amount of the cleaning liquid held in the openings 101*a*. Therefore, the blade 83 passes over the protrusions 92 in a state that a relatively small amount of the cleaning liquid is held. Although there is a gap between the blade 83 and the protrusions 92 when the blade 83 passes over the protrusions 92, since the amount of the cleaning liquid held is relatively small, the cleaning liquid hardly leaks out from the gap.

Figure 17A:
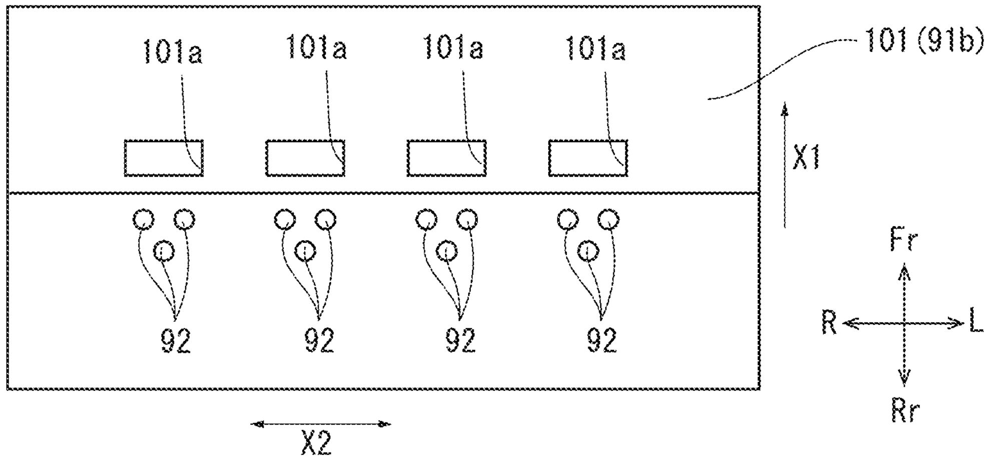
FIG. 17A is a bottom view showing a modified example of the cleaning liquid storage member in the wipe unit of the inkjet recording apparatus according to the embodiment of the present disclosure.
Figure 17B:
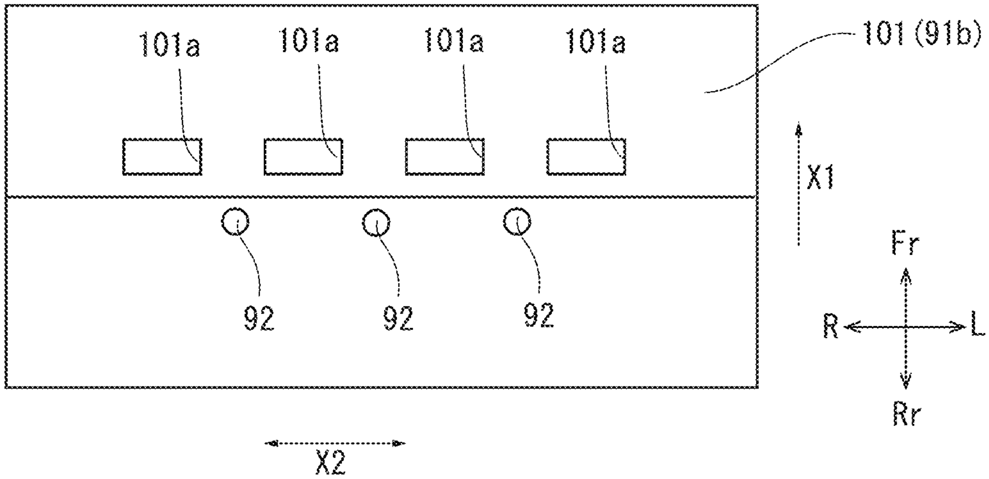
FIG. 17B is a bottom view showing a modified example of the cleaning liquid storage member in the wipe unit of the inkjet recording apparatus according to the embodiment of the present disclosure.

With reference to FIG. 17A to FIG. 17B, a modified example of the cleaning liquid storage member 91 will be described. FIG. 17A to FIG. 17B are bottom views showing the tip end portion 91*b* of the cleaning liquid storage member 91.

As shown in FIG. 17A, a plurality of the protrusions 92 may be provided for one opening 101*a*. For example, three protrusions 92 are provided such that one protrusion is arranged on the upstream side and two protrusions are arranged on the downstream side of the moving direction X1. In this case, the cleaning liquid tends to gather together in the protrusions 92. Further, in FIG. 17A, three protrusions 92 form a group, and there are four groups in total. The distance between the nearest protrusions 92 in the adjacent groups is longer than the distance between the adjacent protrusions 92 in the group. In this way, the cleaning liquid tends to gather in each group. Further, the cleaning liquid can be held in the space between the protrusions 92. Alternatively, as shown in FIG. 17B, the protrusion 92 may be provided between the adjacent openings 101*a* in the blade width direction X2. Alternatively, a plurality of the protrusions may be provided around the opening 101*a*. Also in these cases, since the cleaning liquid leaked (discharged) from the openings 101*a* gathers in the protrusions 92, the leaked (discharged) cleaning liquid can be wiped off with the blade 83 reliably.

The wipe unit 53 includes the blade 83 and the cleaning liquid supply member 75, and is moved to the separated position during the image forming operation. That is, since the head unit 11 is not provided with the cleaning liquid supply member 75, the cleaning liquid supplied from the cleaning liquid supply member 75 does not adhere to the sheet S or the sheet S does not come into contact with the cleaning liquid supply member 75 even when the sheet S is accidentally bent upward during the image forming operation. Therefore, contamination of the sheet S by the cleaning liquid and damage to the cleaning liquid supply member 75 by the sheet S can be prevented.

Further, the supply pipe 123 of the cleaning liquid supply mechanism 57 for supplying the cleaning liquid to the cleaning liquid supply member 75 is only moved to the supply position and the separated position in the upper-and-lower direction, but is not moved in the horizontal direction. Therefore, since the moving distance of the supply pipe 123 is relatively short, it is possible to prevent the pipes 125 connected to the supply pipe 123 from bending and then causing a supply failure. Further, the pipe 125 can be pulled in a narrow space.

Further, since the cleaning liquid supply surface (the lower surface) of the cleaning liquid supply member 75 and the nozzle surface N of the inkjet head 37 are on the same plane at the wiping position, the blade 83 can be brought into smooth contact with the nozzle surface N from the cleaning liquid supply surface when the carriage 73 of the wipe unit 53 is moved.

Further, since the wipe unit 53 includes the sheet member 99 for sealing the gap between the cleaning liquid supply surface of the cleaning liquid supply member 75 and the nozzle surface N, the cleaning liquid can be surely supplied from the cleaning liquid supply surface to the nozzle surface N via the sheet member 99 by the blade 83 even when the wipe unit 53 and the inkjet head 37 are slightly misaligned.

In this embodiment, an example in which the four head units 11 are provided for the colors of ink and the maintenance device 13 is provided for each head unit 11 is described. However, the four head units 11 may be integrally provided, and the maintenance device 13 may be configured such that the four cap units 51 and the four wipe units 53 are integrally provided.

In the present embodiment, an example in which the head unit 11 is configured to be moved to the printing position and the retracted position in the upper-and-lower direction while the conveying unit 9 is configured to be not moved is described. However, the conveying unit 9 may be configured to be moved to the printing position and the retracted position in the upper-and-lower direction while the head unit 11 may be configure to be not moved. In this case, the maintenance device 13 is movably provided in a space formed after the conveying unit 9 is moved to the retracted position.

Although the present disclosure has been described in particular embodiments, the present disclosure is not limited to the foregoing embodiments. A person skilled in the art may modify the above embodiments, so long as they do not deviate from the scope and object of the present disclosure.

The invention claimed is:

1. An ink jet recording apparatus comprising:

an inkjet head provided with a nozzle surface on which ink ejection ports of a plurality of nozzles are opened;

a blade which is movable in contact with the nozzle surface in a moving direction from a moving start position to a moving end position; and a cleaning liquid supply member which stores a cleaning liquid and supplies the cleaning liquid to the blade moving in the moving direction from the moving start position, wherein the cleaning liquid supply member has a lower surface, and the lower surface has at least one opening through which the cleaning liquid is discharged and at least one protrusion which is disposed on an upstream side of the opening in the moving direction and to which the cleaning liquid leaked through the opening and flowed through the lower surface gathers.

2. The inkjet recording apparatus according to claim 1, wherein the at least one protrusion includes a plurality of protrusions.

3. The inkjet recording apparatus according to claim 1, wherein a tip end surface of the protrusion is hemispherical.

4. The inkjet recording apparatus according to claim 1, wherein the protrusion is arranged corresponding to the opening in the moving direction.

5. The inkjet recording apparatus according to claim 1, wherein the at least one opening includes a plurality of openings, and the protrusion is arranged between the openings adjacent to each other in a direction intersecting the moving direction.

6. The inkjet recording apparatus according to claim 5, further comprising:

a wipe unit including the blade and the cleaning liquid supply member, wherein as the wipe unit moves, the blade and the cleaning member are moved.

7. The inkjet recording apparatus according to claim 1, further comprising:

a cleaning liquid supply mechanism which is disposed separated away from the inkjet head and supplies the cleaning liquid to the cleaning liquid supply member, wherein the cleaning liquid supply member is supplied with the cleaning liquid from the cleaning liquid supply mechanism, is then separated away from the cleaning liquid supply mechanism and moved to a position where it can be in contact with the nozzle surface while holding the supplied cleaning liquid.

* * * * *